(12) United States Patent
Cassingham et al.

(10) Patent No.: US 12,319,973 B2
(45) Date of Patent: Jun. 3, 2025

(54) PROCESS FOR THE SIMULTANEOUS TANNING AND DYEING OF COLLAGEN CONTAINING FIBROUS MATERIAL

(71) Applicant: Archroma (Switzerland) GmbH, Pratteln (CH)

(72) Inventors: Darryl Miles Cassingham, Dorset (GB); Georg Roentgen, Freiburg (DE); Athanassios Tzikas, Dornach (CH)

(73) Assignee: Archroma (Switzerland) GmbH, Pratteln (CH)

( * ) Notice: Subject to any disclaimer, the term of this patent is extended or adjusted under 35 U.S.C. 154(b) by 905 days.

(21) Appl. No.: 16/969,783

(22) PCT Filed: Jan. 25, 2019

(86) PCT No.: PCT/EP2019/051825
§ 371 (c)(1),
(2) Date: Aug. 13, 2020

(87) PCT Pub. No.: WO2019/158341
PCT Pub. Date: Aug. 22, 2019

(65) Prior Publication Data
US 2021/0002735 A1    Jan. 7, 2021

(30) Foreign Application Priority Data
Feb. 16, 2018   (EP) .................................. 18157088

(51) Int. Cl.
| | | |
|---|---|---|
| *C14C 3/08* | (2006.01) | |
| *C09B 62/51* | (2006.01) | |
| *C09B 62/513* | (2006.01) | |
| *C09B 62/515* | (2006.01) | |
| *D06P 1/382* | (2006.01) | |
| *D06P 3/32* | (2006.01) | |

(52) U.S. Cl.
CPC .............. *C14C 3/08* (2013.01); *C09B 62/513* (2013.01); *C09B 62/515* (2013.01); *D06P 1/382* (2013.01); *D06P 3/3286* (2013.01)

(58) Field of Classification Search
CPC ....... C14C 3/08; C09B 62/513; C09B 62/515; D06P 1/382; D06P 3/3286
See application file for complete search history.

(56) References Cited

U.S. PATENT DOCUMENTS

| | | | | |
|---|---|---|---|---|
| 658,032 | A | * | 9/1900 | Wartenberger ........... D06P 3/32 8/613 |
| 2,303,477 | A | * | 12/1942 | Donald ...................... C14C 3/28 8/94.26 |
| 2,809,088 | A | * | 10/1957 | Meister ...................... C14C 3/28 8/94.22 |
| 4,622,390 | A | | 11/1986 | Meininger et al. |
| 5,176,717 | A | | 1/1993 | Schaulin et al. |
| 5,548,071 | A | | 8/1996 | Deitz et al. |
| 5,684,138 | A | | 11/1997 | Klier et al. |
| 5,772,698 | A | | 6/1998 | Reichert et al. |
| 5,817,779 | A | * | 10/1998 | Deitz .................. C09B 62/4415 534/642 |
| 6,160,101 | A | | 12/2000 | Tzikas et al. |

(Continued)

FOREIGN PATENT DOCUMENTS

| | | |
|---|---|---|
| CN | 1108278 A | 9/1995 |
| CN | 1399032 | 2/2003 |

(Continued)

*Primary Examiner* — Amina S Khan
(74) *Attorney, Agent, or Firm* — Christensen, Fonder, Dardi PLLC; Elizabeth A. Gallo; Peter S. Dardi

(57) ABSTRACT

A process for the simultaneous tanning and dyeing of collagen containing fibrous material, wherein the said material is treated with a liquor containing at least one reactive dyestuff selected from the group of formula (1) and (2)

$$A_1 \text{—} (Z_1)_{2\text{-}3} \quad \text{and} \tag{1}$$

$$Z_2\text{—}A_2\text{—}\underset{Q_1}{\overset{}{N}}\text{—}\underset{\underset{G_1}{N}}{\overset{N}{\diagdown}}\text{—}\left[\underset{Q_2}{\overset{}{N}}\text{—}B\text{—}\underset{Q_3}{\overset{}{N}}\text{—}\underset{\underset{G_2}{N}}{\overset{N}{\diagdown}}\text{—}\right]_b\underset{Q_4}{\overset{}{N}}\text{—}A_3\text{—}Z_3, \tag{2}$$

wherein $A_1$, $A_2$ and $A_3$ are each independently of the others the radical of a monoazo, polyazo, metal-complexed azo, anthraquinone, phthalocyanine, formazan or dioxazine chromophore having at least one sulfo group, B is an organic bridge member, $Q_1$, $Q_2$, $Q_3$ and $Q_4$ are each independently of the others hydrogen or unsubstituted or substituted $C_1$-$C_4$alkyl, $G_1$ and $G_2$ are halogen, 3-carboxypyridin-1-yl or 3-carbamoylpyridin-1-yl, $(Z_1)_{2\text{-}3}$ is 2 to 3 identical or different fiber reactive radicals, $Z_2$ and $Z_3$ are each independently of the other identical or different fiber reactive radicals, and b is the number 0 or 1, by combining two steps of leather production, tanning and dyeing, into a single step, thus, preserving resources and reducing the environmental impact.

20 Claims, No Drawings

(56) References Cited

U.S. PATENT DOCUMENTS

| | | |
|---|---|---|
| 6,537,332 B1 | 3/2003 | Tzikas et al. |
| 6,930,179 B2 | 8/2005 | Schmiedl et al. |
| 7,087,730 B2 | 8/2006 | Tzikas et al. |
| 7,905,928 B2 | 3/2011 | Tzikas et al. |
| 8,298,298 B1 * | 10/2012 | Miller ............... C09B 43/08 |
| | | 132/202 |
| 8,372,161 B2 * | 2/2013 | Somogyi ............ C09B 62/4415 |
| | | 8/94.1 R |
| 8,382,857 B2 | 2/2013 | Somogyi et al. |
| 2007/0033749 A1 | 2/2007 | Somogyi et al. |
| 2012/0047663 A1 | 3/2012 | Lin et al. |
| 2021/0002735 A1 | 1/2021 | Cassingham et al. |

FOREIGN PATENT DOCUMENTS

| | | |
|---|---|---|
| CN | 1671800 | 9/2005 |
| DE | 960534 C | 3/1957 |
| EP | 0625549 B1 | 11/1994 |
| EP | 1608708 A2 | 12/2005 |
| EP | 3752649 B1 | 11/2021 |
| JP | 2003193100 | 7/2003 |
| JP | 2006527309 | 11/2006 |
| JP | 2007510067 | 4/2007 |
| WO | 2012136428 A1 | 10/2012 |
| WO | 2015044971 A2 | 4/2015 |
| WO | 2017129297 A1 | 8/2017 |

\* cited by examiner

PROCESS FOR THE SIMULTANEOUS TANNING AND DYEING OF COLLAGEN CONTAINING FIBROUS MATERIAL

CROSS-REFERENCE TO RELATED APPLICATIONS

This application is the National Phase of International Application PCT/EP2019/051825 filed Jan. 25, 2019 which designated the U.S. and which claims priority to European App. Serial No. 18157088.8 filed Feb. 16, 2018. The noted applications are incorporated herein by reference The present invention relates to a process for the simultaneous tanning and dyeing of collagen containing fibrous material, for example, a hide or skin. The inventive process allows for the production of leather or leather imitations, such as bonded leather fiber, by combining two steps of leather production, tanning and dyeing, into a single step, thus, preserving resources and reducing the environmental impact.

Simultaneous tanning and dyeing of collagen containing fibrous material in accordance with the present invention is accomplished by the use of selected fiber reactive dyestuffs. U.S. Pat. No. 8,372,161 and U.S. Pat. No. 8,382,857 disclose a process of dyeing leather with reactive dyes. The prior art process relates to the colouration of the leather after tanning, predominantly looking at chrome tanned leather and is silent on the simultaneous tanning and dyeing of the leather raw material.

The value of trade of leather as the value of trade in other important commodities, for example, rubber, cotton, coffee, sugar, and rice, is huge. Accordingly, the manufacture of leather has an environmental impact, in as much as not all the chemicals used in the manufacturing process end up in the leather, but are released into the environment. Also leather becomes a waste material, when it is disposed of the product. The gauge of a leather's eco friendliness is measured by the absence of certain restricted chemicals, such as banned azo dyes, PCP, chrome VI, formaldehyde and an increasing list specified by brands, or the method of tannage. This push originated from the automotive sector, but more recently by environmental pressure groups, eco labels, high street retailers or those seeking to gain competitive advantage through product positioning. The so called ZDHC Programme was recently established by brands to advance towards zero discharge of hazardous chemicals in the textile, leather and footwear value chain.

The history of leather started with primitive man hunting wild animals for food. Hides and skins obtained from the dead animal carcass were used as crude tents, clothing and footwear. A method of preservation was needed, because the skins rapidly putrefied and became useless. However, the early preservation methods, such as drying the skins, had only a limited preserving and softening action. Primitive man discovered that the smoke of wood fires could preserve hides and skins, as did treating them with an infusion of tannin-containing barks, leaves, twigs and fruits of certain trees and plants. It appears that a process to preserve skin and prepare leather was discovered after animal skins were left lying on a wet forest floor and became tanned naturally by chemicals released by decaying leaves and vegetation. Much later the use of earth salts containing alum as a tanning agent to produce soft white leather was discovered. The alum leathers could be dyed with naturally occurring dyestuffs in various plants. Through the centuries leather manufacture expanded steadily and by mediaeval times most towns and villages had a tannery, situated on the local stream or river, which they used as a source of water for processing and as a source of power for their water wheel driven machines.

The whole purpose of tanning is to crosslink and stabilize collagen, typically forming the matrix of a hide or skin to prevent putrefaction and hence decomposition. A decent tannage is also largely irreversible. Another property is that the leather can be much more resistant to shrinkage when subjected to moist heat, compared to raw or untanned hide or skin, that is tanning increases the hydrothermal stability, commonly referred to as the hydrothermal shrinkage temperature.

The quality of tanning is determined by measuring the "hydrothermal stability", more commonly referred to as the "shrinkage temperature". Whenever hides, skins and leathers are gradually heated in water, they reach a temperature at which they are subject to sudden, irreversible shrinkage. Raw hides or skins shrink very easily at temperatures of about 65° C., whereas tanning increases the point at which shrinkage occurs to higher temperatures. This increased resistance to moist heat is an important requirement for leather, for example, when making a wide range of types of footwear in which the leather is subjected to moisture and high temperatures as part of the manufacturing process.

Nowadays a variety of different processes involving different tanning agents are used to tan leather, such as chrome tanning, vegetable tanning and aldehyde tanning. Different types of tanning (both primary tanning and re-tanning) produce different physical properties, including levels of resistance to moist heat in the resulting leather.

None of the indicated tanning technologies commonly applied offers a full environmental advantage over the others when considering all the key criteria that characterise the impact on the environment of these technologies. Many people assume that vegetable tanned leather should have a preferred environmental profile, but this is not supported by the facts at hand. On the other hand, chrome tanned leathers are often assumed to be less desirable because of their mineral content. The aldehyde tanned leathers meet the needs of the automotive sector and appear to fit a niche within children's products that need to comply with EN71/3, but they can have handling, effluent treatment and higher energy consumption issues. Moreover, aldehyde tanning is now too coming under great legislative scrutiny.

Non-metallic tanning creates a very anionic leather. Exhaustion and fixation of other agents used in leather processing, such as other tanning agents, syntans, dyes and fatliquors which are all typically anionic as well, becomes more difficult as the number of functional sites on the collagen are used up. This is well known to those who practice the art in the industry, and so it can be difficult to create, for example, a jet black anionic dyeing on metal free leathers as the dye simply has no more sites in the collagen matrix to react with.

A significant part of the environmental impact of leather is in the manufacturing processes, taking it from a hide to finished leather. In this respect it is the environmental stewardship practice of tanners coupled with chemical selection that should determine how eco friendly a leather is. In accordance with the model adopted by some of the world's leading brands that have been working on these issues, the following areas of leather manufacture that have the most significant potential impact can be identified: management of restricted substances, energy consumption, air emissions, waste management (hazardous and non hazardous), water consumption, control of manufacturing processes, effluent treatment, chrome management and traceability of material.

Accordingly, there is a need for new processes which address the above issues to the highest extent possible, and in particular reduce waste, reduce energy and water consumption, and avoid or reduce the use of restricted substances. The process of the present invention supersedes the use of tanning agents, by applying reactive dyestuffs which simultaneously act as a tanning agent and impose color to the collagen containing fibrous raw material. In accordance with the process of the present invention tanning and dyeing is accomplished together with good exhaustion, good fixation yield and good washing off properties of the unfixed dyestuffs. Two aspects can be completed by the process of the present invention with a single step using effectively the same reactive sites on the collagen for a duality of purpose. At the same time the hydrothermal stability is increased to the desired level. The dyed and tanned fibrous products meet the high quality demands in terms of colour strength and fastness, and migration stability, to specifically mention fastness to rubbing, wet and perspiration fastness and migration fastness.

Accordingly, the present invention relates to a process for the simultaneous tanning and dyeing of collagen containing fibrous material, wherein the said material is treated with a liquor containing at least one reactive dyestuff selected from the group of formula (1) and (2)

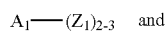  (1)

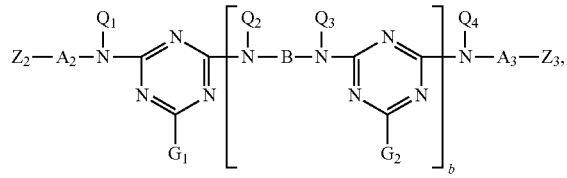  (2)

wherein $A_1$, $A_2$ and $A_3$ are each independently of the others the radical of a monoazo, polyazo, metal-complexed azo, anthraquinone, phthalocyanine, formazan or dioxazine chromophore having at least one sulfo group, B is an organic bridge member, $Q_1$, $Q_2$, $Q_3$ and $Q_4$ are each independently of the others hydrogen or unsubstituted or substituted $C_1$-$C_4$alkyl, $G_1$ and $G_2$ are halogen, 3-carboxypyridin-1-yl or 3-carbamoylpyridin-1-yl, $(Z_1)_{2-3}$ is 2 to 3 identical or different fiber reactive radicals, $Z_2$ and $Z_3$ are each independently of the other identical or different fiber reactive radicals, and b is the number 0 or 1.

In the context of the present invention "collagen containing fibrous material" is to be understood a pelt, hide or skin with its original fibrous structure more or less intact, including split from animal skin, for example, the underside of the animal skin to manufacture suede leather. Furthermore, it includes collagen fibrous material from any other suitable source of collagen, for example, waste/poor quality collagen, such as waste and shavings generated in the production of leather, or from other natural or synthetic sources of collagen. The said collagen fibrous material from any other suitable source of collagen is treated in accordance with the process of the present invention either before or after reforming it into sheet like materials and fibers suitable for further processing to produce, for example, bonded leather and hydroentangled leather like material.

The process of the present invention can be conducted with one or more than one, for example, two, three or more reactive dyestuffs selected from the group of formula (1) and (2). The two, three or more reactive dyestuffs can be selected either from the group of dyestuffs defined by generic formula (1), or the group of dyestuffs defined by generic formula (2), or from the larger group of dyestuffs defined by generic formula (1) and formula (2).

According to a certain embodiment, the process of the present invention is conducted with at least one reactive dyestuff of formula (1).

The $C_1$-$C_4$alkyl radicals $Q_1$, $Q_2$, $Q_3$ and $Q_4$ in the reactive dye of formula (2) are straight-chain or branched. The $C_1$-$C_4$alkyl radicals may be further substituted, for example by hydroxy, sulfo, sulfato, cyano or by carboxy. The following radicals may be mentioned by way of example: methyl, ethyl, propyl, isopropyl, butyl, isobutyl, sec-butyl and tert-butyl, and also the corresponding hydroxy-, sulfo-, sulfato-, cyano- or carboxy-substituted radicals. Preferred as substituents are hydroxy, sulfo and sulfato, especially hydroxy and sulfato, and preferably hydroxy.

$Q_1$ and $Q_4$ are preferably hydrogen or $C_1$-$C_4$alkyl, especially hydrogen.

$Q_2$ and $Q_3$ are preferably each independently of the other hydrogen or unsubstituted or hydroxy-, sulfo-, sulfato-, cyano- or carboxy-substituted $C_1$-$C_4$alkyl. According to an embodiment of interest, one of the radicals $Q_2$ and $Q_3$ is hydroxy-, sulfo-, sulfato-, cyano- or carboxy-substituted $C_1$-$C_4$alkyl, and the other of the radicals $Q_2$ and $Q_3$ is hydrogen or $C_1$-$C_4$alkyl, especially hydrogen.

$Q_2$ and $Q_3$ are especially preferably each independently of the other hydrogen or $C_1$-$C_4$alkyl, especially hydrogen.

$G_1$ and $G_2$ are preferably each independently of the other halogen, for example, chlorine or fluorine, and especially chlorine.

The following come into consideration as organic bridge members B, for example:

$C_2$-$C_{12}$alkylene radicals, especially $C_2$-$C_6$alkylene radicals, which may be interrupted by 1, 2 or 3 members from the group —NH—, —N(CH$_3$)— and —O—, especially —O—, and are unsubstituted or substituted by hydroxy, sulfo, sulfato, cyano or by carboxy;

preferred substituents of the alkylene radicals mentioned for B being hydroxy, sulfo and sulfato, especially hydroxy;

$C_5$-$C_9$cycloalkylene radicals, such as cyclohexylene radicals, that are unsubstituted or substituted by $C_1$-$C_4$alkyl, $C_1$-$C_4$alkoxy, $C_2$-$C_4$alkanoylamino, sulfo, halogen or by carboxy, especially by $C_1$-$C_4$alkyl;

methylene-cyclohexylene-methylene radicals that are unsubstituted or substituted in the cyclohexylene ring by $C_1$-$C_4$alkyl;

$C_1$-$C_6$alkylenephenylene, or preferably phenylene, that is unsubstituted or substituted by $C_1$-$C_4$alkyl, $C_1$-$C_4$alkoxy, $C_2$-$C_4$alkanoylamino, sulfo, halogen or by carboxy, preferably, sulfo.

Also suitable as a radical of formula —N($Q_2$)—B—N($Q_3$)— is a radical of the formula

Preferably B is a $C_2$-$C_{12}$alkylene radical which may be interrupted by 1, 2 or 3 members from the group —NH—, —N(CH$_3$)— and —O—, especially —O—, and is unsubstituted or substituted by hydroxy, sulfo, sulfato, cyano or by carboxy; or a phenylene radical that is unsubstituted or substituted by $C_1$-$C_4$alkyl, $C_1$-$C_4$alkoxy, $C_2$-$C_4$-alkanoylamino, sulfo, halogen or by carboxy.

B is especially a $C_2$-$C_6$alkylene radical, which may be interrupted by 1, 2 or 3 —O— members and is unsubstituted or substituted by hydroxy, or phenylene substituted by one or two sulfo groups.

Fiber reactive radicals $Z_1$, $Z_2$ and $Z_3$ are generally known in the field of fiber reactive textile dyes, and to be understood as meaning those which are capable of reacting with the hydroxy groups of cellulose, the amino, carboxy, hydroxy and thiol groups in wool and silk to form covalent chemical bonds. The fiber reactive radicals are as a rule bonded to the chromophore radical $A_1$, $A_2$ and $A_3$ directly or via a bridge member. Suitable fiber reactive radicals $Z_1$, $Z_2$ and $Z_3$ are, for example, those which contain at least one substituent which can be split off on an aliphatic, aromatic or heterocyclic radical, or in which the radicals mentioned contain a radical which is capable of reaction with the fiber material, for example a vinyl radical. Such fiber reactive radicals are known.

The dyestuff of formula (1) contains 2 or 3 identical or different fiber reactive radicals $Z_1$. Preferably, the fiber reactive radicals $Z_1$ are attached to the chromophore radical $A_1$ in a steric configuration which allows to effectively crosslink the collagen matrix, that is the fiber reactive radicals $Z_1$ are remote from each other to effectively react at remote sites of the collagen matrix.

Preferably fiber reactive radicals $Z_1$, $Z_2$ and $Z_3$ each independently of the others are a radical the formula

 (3a)

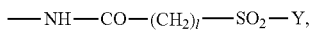 (3b)

 (3c)

 (3d)

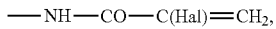 (3e)

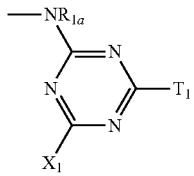 (3f)

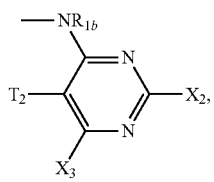 (3g)

in which
Hal is chlorine or bromine;
$X_1$ is halogen, 3-carboxypyridin-1-yl or 3-carbamoylpyridin-1-yl;

$T_1$ independently has the meaning of $X_1$, or is a substituent which is not fiber reactive, or a fiber reactive radical of the formula

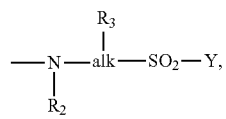 (4a)

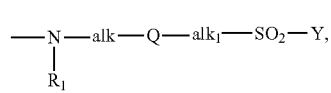 (4b)

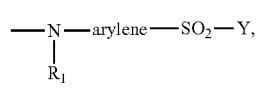 (4c)

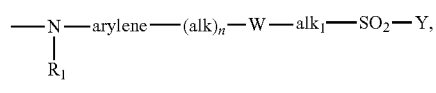 (4d)

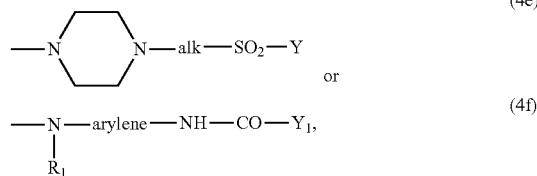 (4e)

or

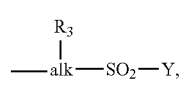 (4f)

in which
$R_1$, $R_{1a}$ and $R_{1b}$ independently of one another are each hydrogen or $C_1$-$C_4$alkyl, $R_2$ is hydrogen, $C_1$-$C_4$alkyl which is unsubstituted or substituted by hydroxyl, sulfo, sulfato, carboxyl or cyano or a radical

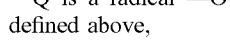

$R_3$ is hydrogen, hydroxyl, sulfo, sulfato, carboxyl, cyano, halogen, $C_1$-$C_4$alkoxycarbonyl, $C_1$-$C_4$alkanoyloxy, carbamoyl or the group —SO$_2$—Y, alk and alk$_1$ independently of one another are linear or branched $C_1$-$C_6$alkylene, arylene is a phenylene or naphthylene radical which is unsubstituted or substituted by sulfo, carboxyl, $C_1$-$C_4$alkyl, $C_1$-$C_4$alkoxy or halogen, Q is a radical —O— or —NR$_1$—, in which $R_1$ is as defined above, W is a group —SO$_2$—NR$_2$—, —CONR$_2$— or —NR$_2$CO—, in which R$_2$ is as defined above, Y is vinyl or a radical —CH$_2$—CH$_2$—U and U is a group which can be split off under alkaline conditions, $Y_1$ is a group —CH(Hal)-CH$_2$-Hal or —C(Hal)=CH$_2$ and Hal is chlorine or bromine and l and m independently of one another are an integer from 1 to 6 and n is the number 0 or 1; and $X_2$ is halogen or $C_1$-$C_4$alkylsulfonyl;
$X_3$ is halogen or $C_1$-$C_4$alkyl; and
$T_2$ is hydrogen, cyano or halogen.

A group U which can be split off under alkaline conditions is, for example, —Cl, —Br, —F, —OSO$_3$H, —SSO$_3$H, —OCO—CH$_3$, —OPO$_3$H$_2$, —OCO—C$_6$H$_5$, —OSO$_2$—C$_1$-C$_4$alkyl or —OSO$_2$—N(C$_1$-C$_4$alkyl)$_2$. U is preferably a group of the formula —Cl, —OSO$_3$H, —SSO$_3$H, —OCO—

$CH_3$, —OCO—$C_6H_5$ or —$OPO_3H_2$, in particular —Cl or —$OSO_3H$, and particularly preferably —$OSO_3H$.

Examples of suitable radicals Y are accordingly vinyl, β-bromo- or β-chloroethyl, β-acetoxyethyl, β-benzoyloxyethyl, β-phosphatoethyl, β-sulfatoethyl and β-thiosulfatoethyl. Y is preferably vinyl, β-chloroethyl or β-sulfatoethyl, and in particular vinyl or β-sulfatoethyl.

$R_1$, $R_{1a}$ and $R_{1b}$ independently of one another are each preferably hydrogen, methyl or ethyl, and particularly preferably hydrogen.

$R_2$ is preferably hydrogen or $C_1$-$C_4$alkyl, such as methyl, ethyl, propyl, isopropyl, butyl, isobutyl, sec-butyl or tert-butyl, and particularly preferably hydrogen, methyl or ethyl. $R_2$ is particularly preferably hydrogen.

$R_3$ is preferably hydrogen.

l and m independently of one another are preferably the number 2, 3 or 4, and particularly preferably the number 2 or 3.

Especially preferably, l is the number 3 and m is the number 2.

Substituents $T_1$ which are not fiber reactive are, for example, the following radicals: hydroxy;

$C_1$-$C_4$alkoxy, for example methoxy, ethoxy, n- or isopropoxy or n-, sec-, iso- or tert-butoxy, in particular methoxy or ethoxy; the radicals mentioned are unsubstituted or substituted in the alkyl moiety, for example by $C_1$-$C_4$alkoxy, hydroxyl, sulfo or carboxyl;

$C_1$-$C_4$alkylthio, for example methylthio, ethylthio, n- or isopropylthio or n-butylthio; the radicals mentioned are unsubstituted or substituted in the alkyl moiety, for example by $C_1$-$C_4$alkoxy, hydroxyl, sulfo or carboxyl;

amino;

morpholinio;

N-mono- or N,N-di-$C_1$-$C_6$alkylamino, preferably N-mono- or N,N-di-$C_1$-$C_4$alkylamino; the radicals mentioned are unsubstituted, uninterrupted or interrupted in the alkyl moiety by oxygen or substituted in the alkyl moiety, for example by $C_2$-$C_4$alkanoylamino, $C_1$-$C_4$alkoxy, hydroxy, sulfo, sulfato, carboxy, cyano, carbamoyl or sulfamoyl; examples are N-methylamino, N-ethylamino, N-propylamino, N,N-di-methylamino or N,N-di-ethylamino, N-β-hydroxyethylamino, N,N-di-β-hydroxyethylamino, N-2-(β-hydroxyethoxy)ethylamino, N-2-[2-(β-hydroxyethoxy)ethoxy]ethylamino, N-β-sulfatoethylamino, N-β-sulfoethylamino, N-carboxymethylamino, N-β-carboxyethylamino, N-α,β-dicarboxyethylamino, N-α,γ-dicarboxypropylamino, N-ethyl-N-β-hydroxyethylamino or N-methyl-N-β-hydroxyethylamino; $C_5$-$C_7$cycloalkylamino, for example cyclohexylamino, which includes both the unsubstituted radicals and the radicals substituted in the cycloalkyl ring, for example by $C_1$-$C_4$alkyl, in particular methyl, or carboxy;

phenylamino or N—$C_1$-$C_4$alkyl-N-phenylamino, which includes both the unsubstituted radicals and the radicals substituted in the phenyl ring, for example by $C_1$-$C_4$alkyl, $C_1$-$C_4$alkoxy, $C_2$-$C_4$alkanoylamino, carboxy, carbamoyl, sulfo or halogen, for example 2-, 3- or 4-chlorophenylamino, 2-, 3- or 4-methylphenylamino, 2-, 3- or 4-methoxyphenylamino, 2-, 3- or 4-sulfophenylamino, disulfophenylamino or 2-, 3- or 4-carboxyphenylamino; naphthylamino which is unsubstituted or substituted in the naphthyl ring, for example by sulfo, preferably the radicals substituted by 1 to 3 sulfo groups, for example 1- or 2-naphthylamino, 1-sulfo-2-naphthylamino, 1,5-disulfo-2-naphthylamino or 4,8-disulfo-2-naphthylamino; or benzylamino which is unsubstituted or substituted in the phenyl moiety, for example by $C_1$-$C_4$alkyl, $C_1$-$C_4$alkoxy, carboxy, sulfo or halogen.

A radical $T_1$ which is not fiber reactive is preferably $C_1$-$C_4$alkoxy; $C_1$-$C_4$alkylthio; hydroxy; amino; N-mono- or N,N-di-$C_1$-$C_4$alkylamino which are optionally substituted in the alkyl moiety by hydroxy, sulfato or sulfo; morpholino; phenylamino or N—$C_1$-$C_4$alkyl-N-phenylamino which are unsubstituted or substituted in the phenyl ring by sulfo, carboxy, acetylamino, chlorine, methyl or methoxy and in which the alkyl is unsubstituted or substituted by hydroxy, sulfo or sulfato, or naphthylamino which is unsubstituted or substituted by 1 to 3 sulfo groups.

Particularly preferred radicals $T_1$ which are not fiber reactive are amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, N-β-sulfatoethylamino, N-β-sulfoethylamino, morpholino, 2-, 3- or 4-carboxyphenylamino, 2-, 3- or 4-sulfophenylamino or N—$C_1$-$C_4$-alkyl-N-phenylamino.

$X_1$ is preferably halogen, for example fluorine or chlorine, and particularly preferably chlorine.

Halogen $T_2$, $X_2$ and $X_3$ are, for example, fluorine, chlorine or bromine, in particular chlorine or fluorine.

$C_1$-$C_4$alkylsulfonyl $X_2$ is, for example, ethylsulfonyl or methylsulfonyl, and in particular methylsulfonyl.

$C_1$-$C_4$alkyl $X_3$ is, for example, methyl, ethyl, n- or isopropyl or n-, iso or tert-butyl, and in particular methyl.

$X_2$ and $X_3$ independently of one another are preferably chlorine or fluorine.

$T_2$ is preferably cyano or chlorine.

Hal is preferably bromine.

alk and $alk_1$ independently of one another are, for example, a methylene, ethylene, 1,3-propylene, 1,4-butylene, 1,5-pentylene or 1,6-hexylene radical or branched isomers thereof.

alk and $alk_1$ independently of one another are preferably each a $C_1$-$C_4$alkylene radical, and particularly preferably an ethylene radical or propylene radical.

arylene is preferably a 1,3- or 1,4-phenylene radical which is unsubstituted or substituted, for example by sulfo, methyl, methoxy or carboxy, and particularly preferably an unsubstituted 1,3- or 1,4-phenylene radical.

Q is preferably —NH— or —O—, and particularly preferably —O—.

W is preferably a group of the formula —CONH— or —NHCO—, in particular a group of the formula —CONH—.

n is preferably the number 0.

The fiber reactive radicals of the formulae (4a) to (4f) are preferably those in which W is a group of the formula —CONH—, $R_1$, $R_2$ and $R_3$ are each hydrogen, Q is the radical —O— or —NH—, alk and $alk_1$ independently of one another are each ethylene or propylene, arylene is phenylene which is unsubstituted or substituted by methyl, methoxy, carboxy or sulfo, Y is vinyl or β-sulfatoethyl, $Y_1$ is —CHBr—$CH_2$Br or —CBr=$CH_2$ and n is the number 0.

Particularly preferably the fiber reactive radicals $Z_1$, $Z_2$ and $Z_3$ each independently of the others are a radical of the formula (3a), (3b) or (3f), in which Y is vinyl, β-chloroethyl or β-sulfatoethyl, $R_{1a}$ is hydrogen, l is the number 2 or 3, $X_1$ is halogen, $T_1$ is $C_1$-$C_4$alkoxy, $C_1$-$C_4$alkylthio, hydroxyl, amino, N-mono- or N,N-di-$C_1$-$C_4$alkylamino which are unsubstituted or substituted in the alkyl moiety by hydroxy, sulfato or sulfo, morpholino, phenylamino or N—$C_1$-$C_4$alkyl-N-phenylamino which are unsubstituted or substituted in the phenyl ring by sulfo, carboxy, acetylamino, chlorine, methyl or methoxy and in which the alkyl is unsubstituted or substituted by hydroxy, sulfo or sulfato, or naphthylamino which is unsubstituted or substituted by 1 to 3 sulfo groups, or $T_1$ is a fiber reactive radical of the formula

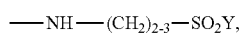
(4a')

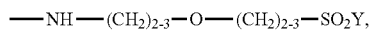
(4b')

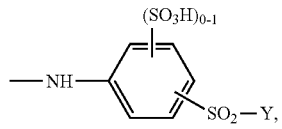
(4c')

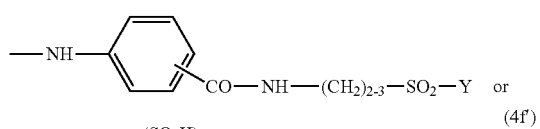
(4d')

or (4f')

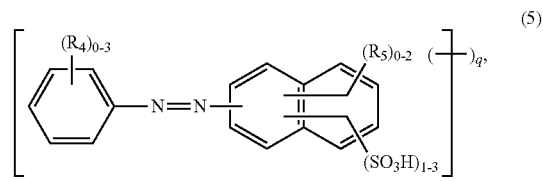

in particular (4b') or (4c'), in which

Y is as defined above and $Y_1$ is a group —CH(Br)—$CH_2$—Br or —C(Br)=$CH_2$.

A radical $A_1$, $A_2$ and $A_3$ as the radical of a monoazo, polyazo, metal-complexed azo, anthra-quinone, phthalocyanine, formazan or dioxazine chromophore may have the substituents customary in organic dyes bonded to its base structure.

The following may be mentioned as examples of substituents in the radicals $A_1$, $A_2$ and $A_3$: $C_1$-$C_4$alkyl groups having from 1 to 4 carbon atoms, such as methyl, ethyl, propyl, isopropyl or butyl, it being possible for the alkyl radicals to be further substituted e.g. by hydroxy, sulfo or by sulfato; $C_1$-$C_4$alkoxy groups having from 1 to 4 carbon atoms, such as methoxy, ethoxy, propoxy, isopropoxy or butoxy, it being possible for the alkyl radicals to be further substituted, for example, by hydroxy, sulfo or by sulfato; phenyl that is unsubstituted or substituted by $C_1$-$C_4$alkyl, $C_1$-$C_4$alkoxy, halogen, carboxy or by sulfo; acylamino groups having from 1 to 8 carbon atoms, especially such $C_2$-$C_4$alkanoylamino groups, e.g. acetylamino or propionylamino; benzoylamino that is unsubstituted or substituted in the phenyl ring by $C_1$-$C_4$alkyl, $C_1$-$C_4$alkoxy, halogen or by sulfo; phenylamino that is unsubstituted or substituted in the phenyl ring by $C_1$-$C_4$alkyl, $C_1$-$C_4$alkoxy, halogen or by sulfo; N,N-di-β-hydroxyethylamino; N,N-di-β-sulfatoethylamino; sulfobenzylamino; N,N-disulfobenzylamino; $C_1$-$C_4$alkoxycarbonyl having from 1 to 4 carbon atoms in the alkoxy radical, such as methoxycarbonyl or ethoxycarbonyl; $C_1$-$C_4$alkylsulfonyl having from 1 to 4 carbon atoms, such as methylsulfonyl or ethylsulfonyl; amino; cyano; halogen, such as fluorine, chlorine or bromine; carbamoyl; N-alkylcarbamoyl having from 1 to 4 carbon atoms in the alkyl radical, such as N-methylcarbamoyl or N-ethylcarbamoyl; sulfamoyl; N-mono- or N,N-di-alkylsulfamoyl each having from 1 to 4 carbon atoms, such as N-methylsulfamoyl, N-ethylsulfamoyl, N-propylsulfamoyl, N-isopropylsulfamoyl or N-butylsulfamoyl, it being possible for the alkyl radicals to be further substituted e.g. by hydroxy or by sulfo; N-(β-hydroxyethyl)-sulfamoyl; N,N-di(β-hydroxyethyl)sulfamoyl; N-phenylsulfamoyl that is unsubstituted or substituted by $C_1$-$C_4$alkyl, $C_1$-$C_4$alkoxy, halogen, carboxy or by sulfo; ureido; hydroxy; carboxy; sulfomethyl or sulfo.

Preferably b in the dyestuff of formula (2) is the number 1.

When $A_1$, $A_2$ and $A_3$ each independently of the others are the radical of a monoazo or polyazo chromophore, the following radicals, especially, come into consideration:

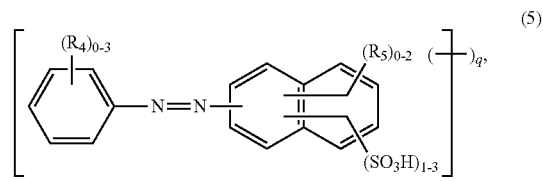
(5)

wherein $(R_4)_{0-3}$ denotes from 0 to 3 identical or different substituents from the group $C_1$-$C_4$alkyl, $C_1$-$C_4$alkoxy, $C_2$-$C_4$alkanoylamino, ureido, sulfamoyl, carbamoyl, sulfomethyl, halogen, amino, hydroxy, carboxy and sulfo, $(R_5)_{0-2}$ denotes from 0 to 2 identical or different substituents from the group hydroxy, amino, N-mono-$C_1$-$C_4$alkylamino, N,N-di-$C_1$-$C_4$alkylamino, $C_2$-$C_4$alkanoylamino and benzoylamino, and q in formula (5) is the number 2 or 3, that is q depicts 2 or 3 bonds attached to the chromophore;

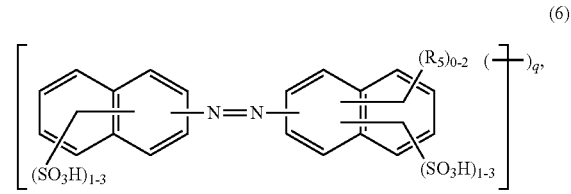
(6)

wherein $(R_5)_{0-2}$ is as defined above, and q in formula (6) is the number 2 or 3, that is q depicts 2 or 3 bonds attached to the chromophore;

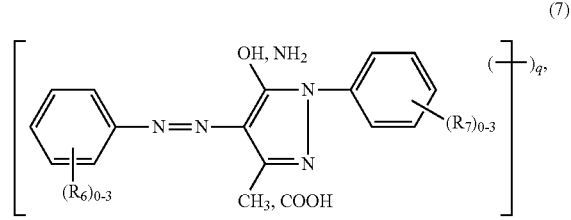
(7)

wherein $(R_6)_{0-3}$ and $(R_7)_{0-3}$ independently of the other denotes from 0 to 3 identical or different substituents from the group $C_1$-$C_4$alkyl, $C_1$-$C_4$alkoxy, halogen, carboxy and sulfo, and q in formula (7) is the number 2 or 3, that is q depicts 2 or 3 bonds attached to the chromophore;

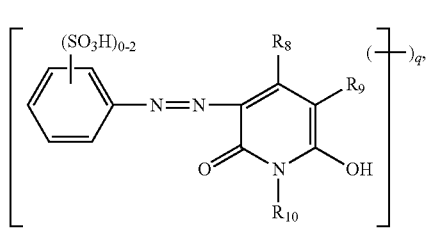

(8)

wherein $R_8$ and $R_{10}$ are each independently of the other hydrogen, $C_1$-$C_4$alkyl or phenyl, $R_9$ hydrogen, cyano, carbamoyl or sulfomethyl, and q in formula (8) is the number 2 or 3, that is q depicts 2 or 3 bonds attached to the chromophore;

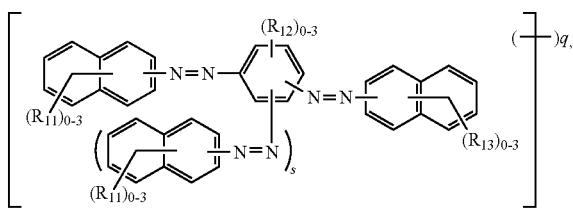

(9)

wherein $(R_{11})_{0-3}$ is as defined for $(R_4)_{0-3}$, $(R_{12})_{0-3}$ denotes from 0 to 3 identical or different substituents from the group $C_1$-$C_4$alkyl, $C_1$-$C_4$alkoxy, halogen, amino, carboxy and sulfo, $(R_{13})_{0-3}$ is as defined for $(R_4)_{0-3}$, or $R_{13}$ is a radical —N=N-Ph, wherein Ph is phenyl that is unsubstituted or substituted by $C_1$-$C_4$alkyl, $C_1$-$C_4$alkoxy, halogen, carboxy or sulfo, s is the number 0 or 1, and q in formula (9) is the number 2 or 3, that is q depicts 2 or 3 bonds attached to the chromophore;

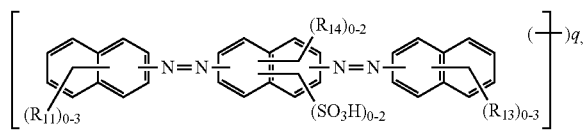

(10)

wherein $(R_{11})_{0-3}$ and $(R_{13})_{0-3}$ independently of the other are as defined above, $(R_{14})_{0-2}$ denotes from 0 to 2 identical or different substituents from the group $C_1$-$C_4$alkyl, $C_1$-$C_4$alkoxy, halogen, carboxy, sulfo, hydroxyl, amino, N-mono-$C_1$-$C_4$alkylamino, N,N-di-$C_1$-$C_4$alkylamino, $C_2$-$C_4$alkanoylamino and benzoylamino, and q in formula (10) is the number 2 or 3, preferably the number 2, that is q depicts 2 or 3 bonds, preferably 2 bonds, attached to the chromophore.

When $A_1$, $A_2$ and $A_3$ each independently of the others are the radical of a formazan dye the following radicals, especially, come into consideration:

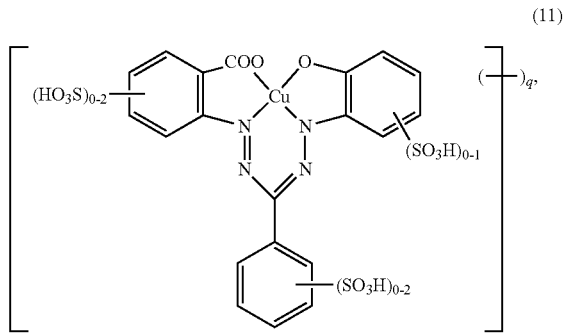

(11)

wherein the benzene nuclei do not contain any further substituents or are further substituted by $C_1$-$C_4$alkyl, $C_1$-$C_4$alkoxy, $C_1$-$C_4$alkylsulfonyl, halogen or by carboxy, and q is the number 2 or 3, that is q depicts 2 or 3 bonds attached to the chromophore.

When $A_1$, $A_2$ and $A_3$ each independently of the others are the radical of a phthalocyanine dye the following radicals, especially, come into consideration:

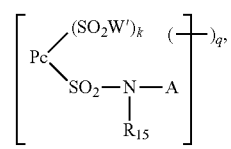

(12)

wherein

Pc is the radical of a metal phthalocyanine, especially the radical of a copper or nickel phthalocyanine, W' is —OH and/or —$NR_{16}R_{16}$' and $R_{16}$ and $R_{16}$' are each independently of the other hydrogen or $C_1$-$C_4$alkyl that is unsubstituted or substituted by hydroxyl or by sulfo, $R_{15}$ is hydrogen or $C_1$-$C_4$alkyl, A is a phenylene radical that is unsubstituted or substituted by $C_1$-$C_4$alkyl, $C_1$-$C_4$alkoxy, halogen, carboxy or by sulfo, or is a $C_2$-$C_6$alkylene radical, k is from 1 to 3, and q is the number 2 or 3, that is q depicts 2 or 3 bonds attached to the chromophore.

When $A_1$, $A_2$ and $A_3$ are the radical of a dioxazine dye the following radicals, especially, come into consideration:

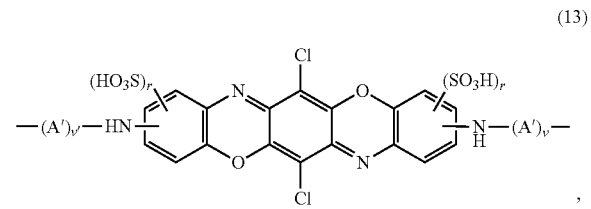

(13)

wherein

A' is a phenylene radical that is unsubstituted or substituted by $C_1$-$C_4$alkyl, $C_1$-$C_4$alkoxy, halogen, carboxy or by sulfo, or is a $C_2$-$C_6$alkylene radical, r independently is the number 0, 1 or 2, preferably 0 or 1, and v and v' are each independently of the other the number 0 or 1.

In a certain embodiment of the present invention, $A_1$, $A_2$ and $A_3$ each independently of the others are the radical of a monoazo, polyazo, metal-complexed azo, formazane or dioxazine chromophore.

In a particular embodiment of the present invention, $A_1$, $A_2$ and $A_3$ each independently of the others are the radical of a monoazo, polyazo, or dioxazine chromophore.

In a particularly preferred embodiment of the present invention, $A_1$, $A_2$ and $A_3$ each independently of the others are the radical of a monoazo or polyazo chromophore. Interesting monoazo or polyazo chromophores are the radicals of formula (5), (6), (9) and (10), especially the radicals of formula (9) and (10).

Special interest is accorded to reactive dyes of the formulae

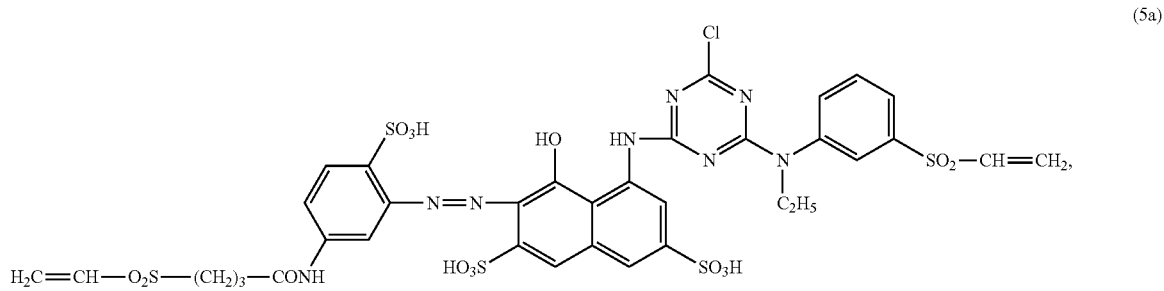

(5a)

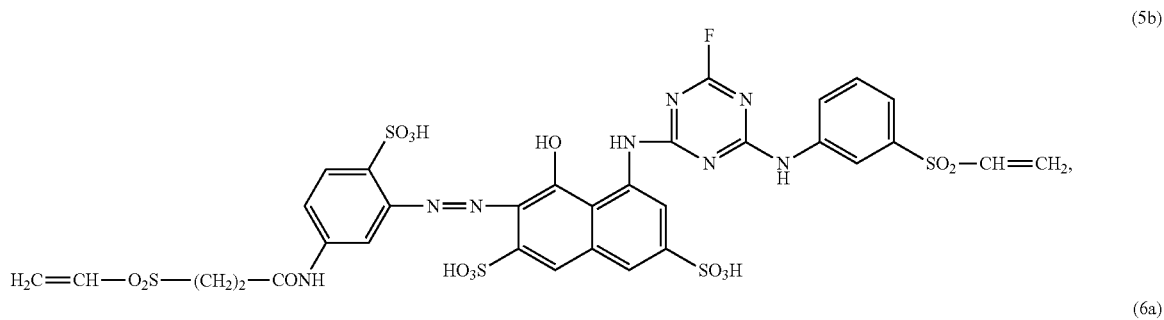

(5b)

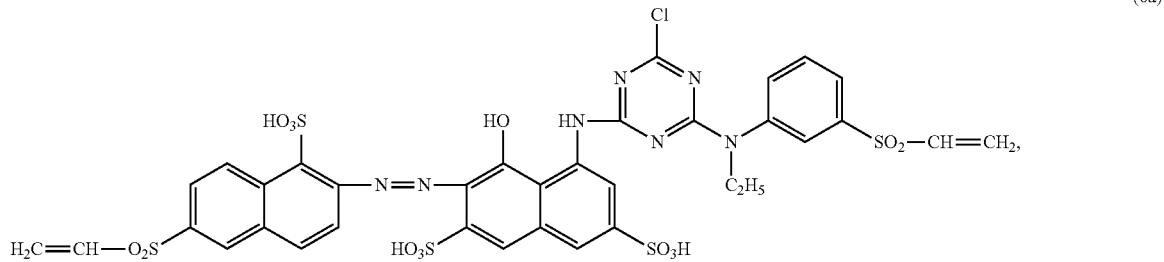

(6a)

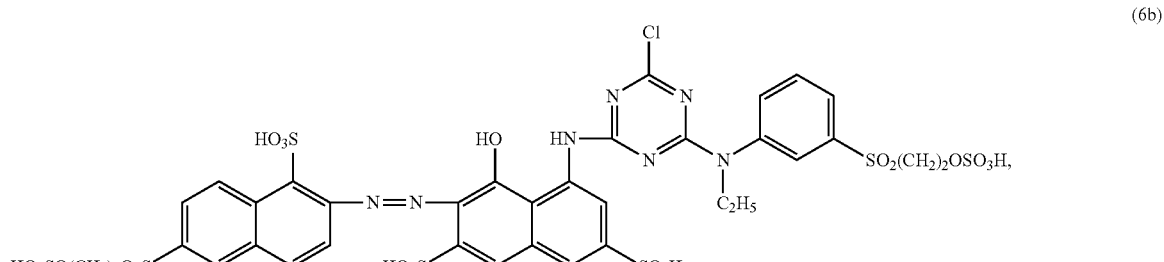

(6b)

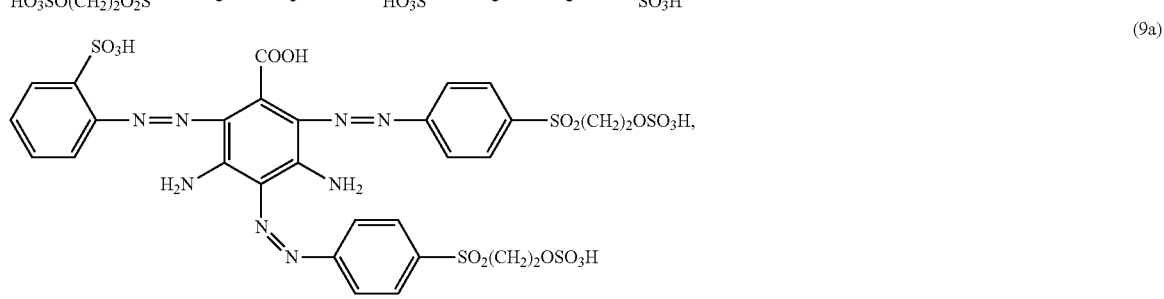

(9a)

-continued
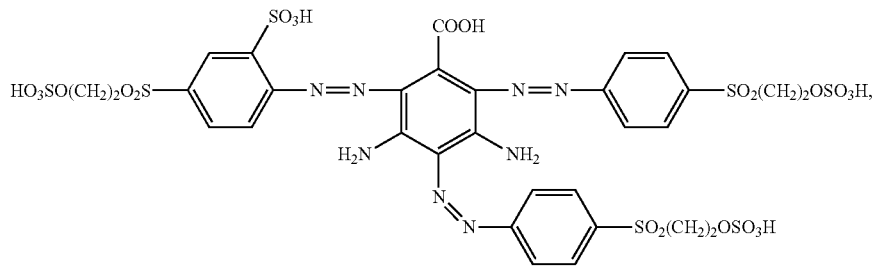
(9b)
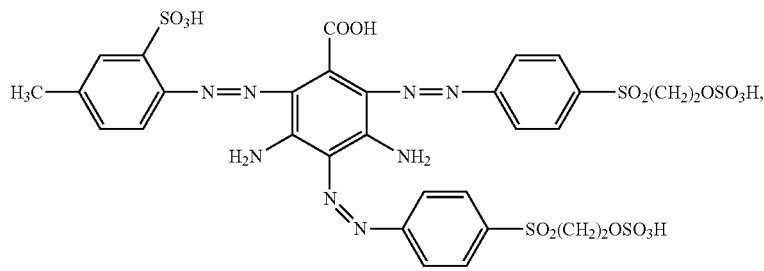
(9c)
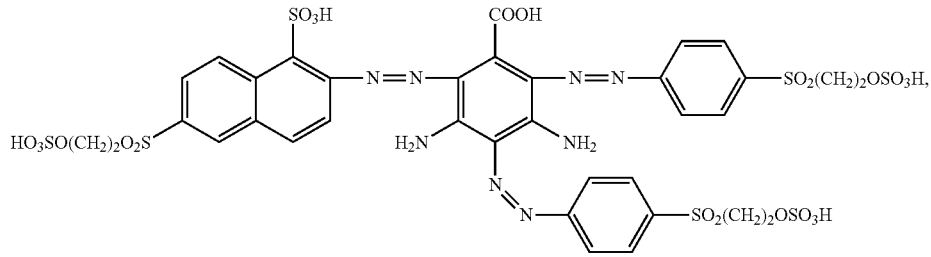
(9d)
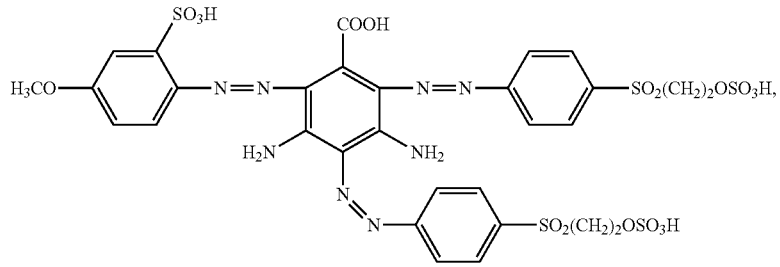
(9e)
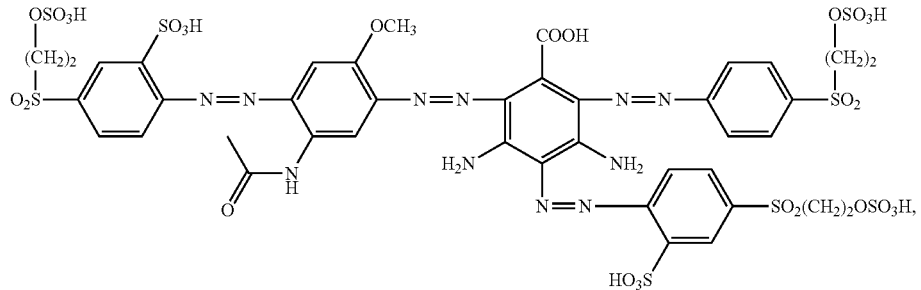
(9f)
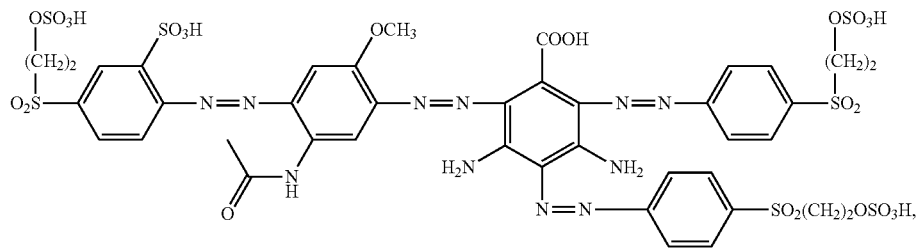
(9g)

-continued
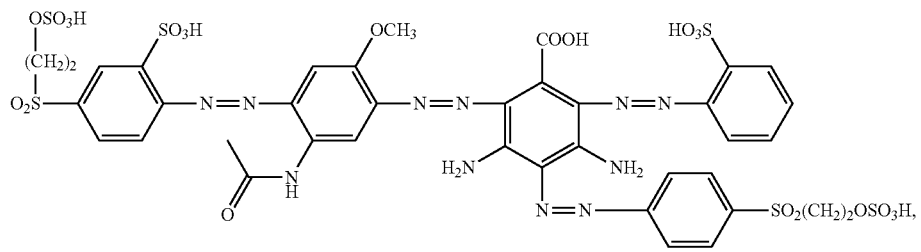
(9h)
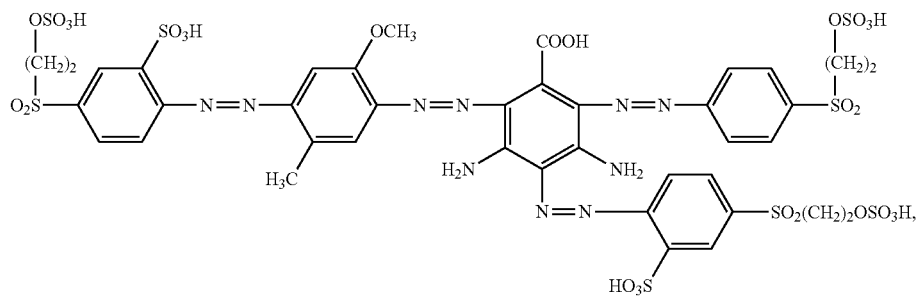
(9i)
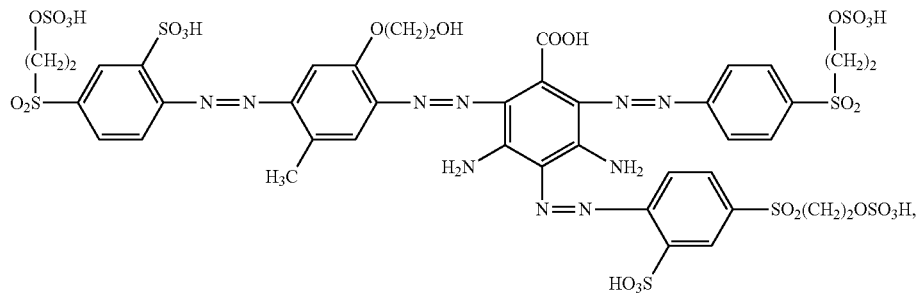
(9j)
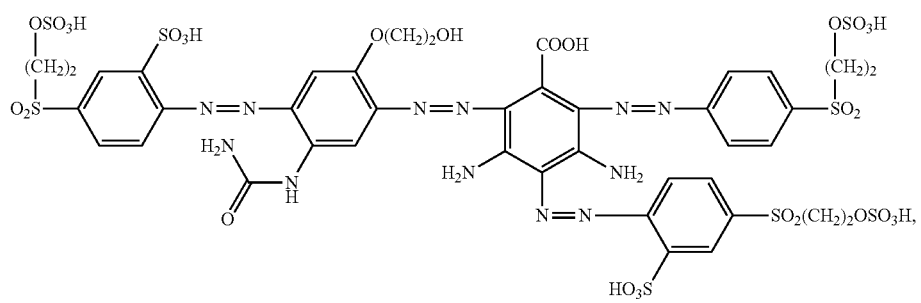
(9k)
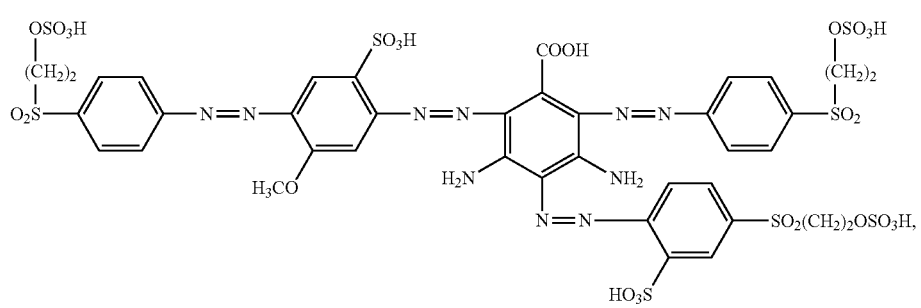
(9l)

-continued
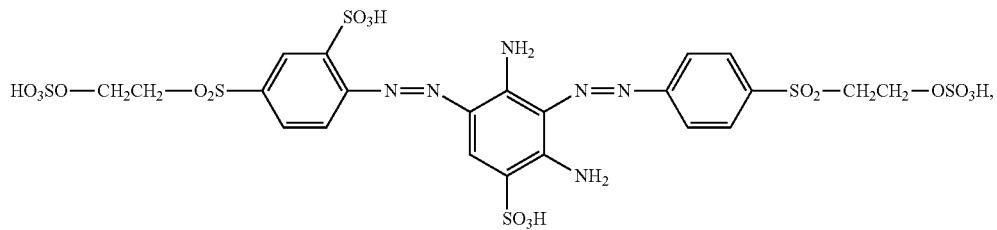
(9m)
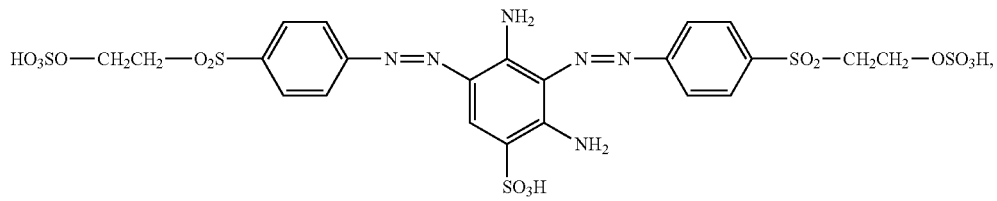
(9n)
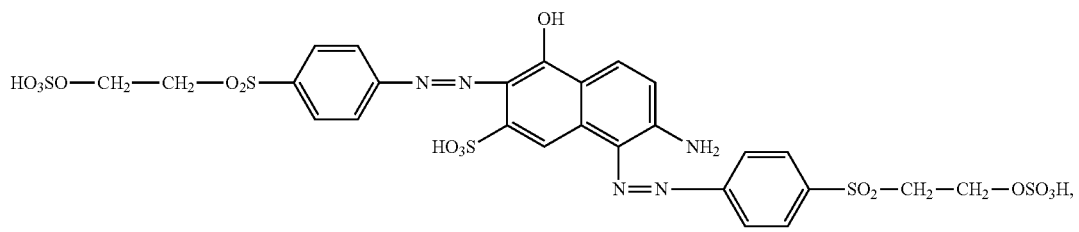
(10a)
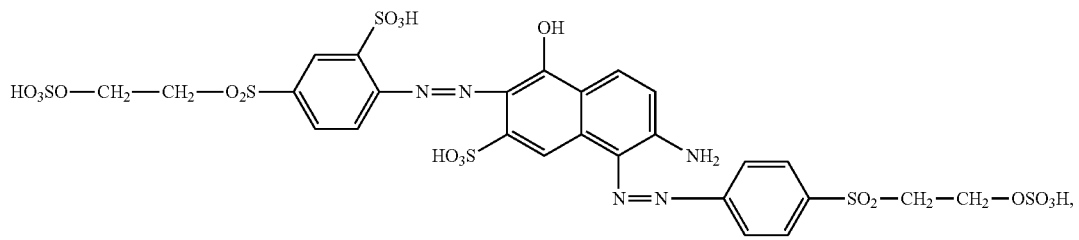
(10b)
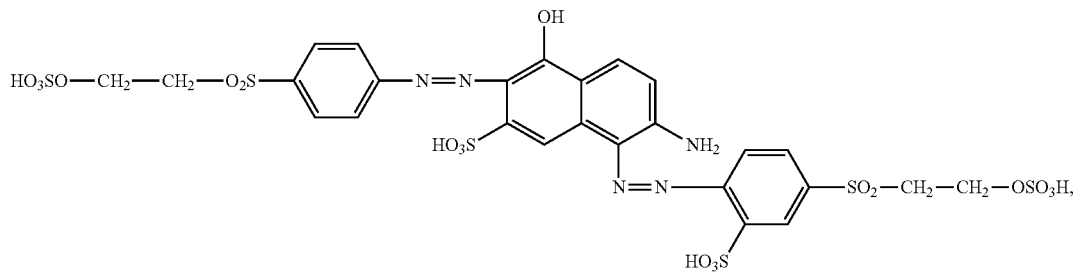
(10c)
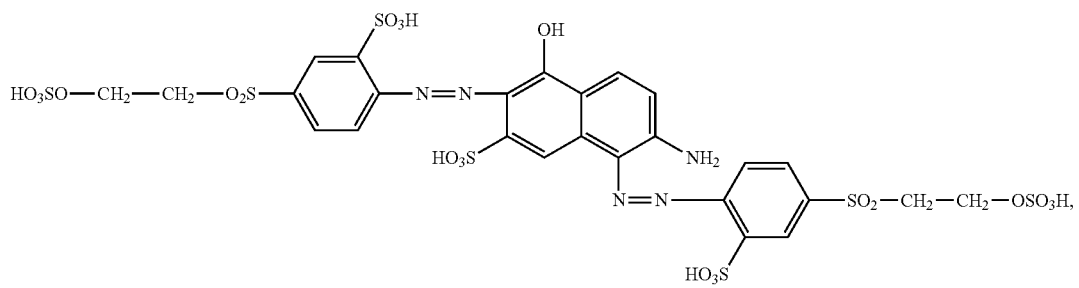
(10d)

-continued
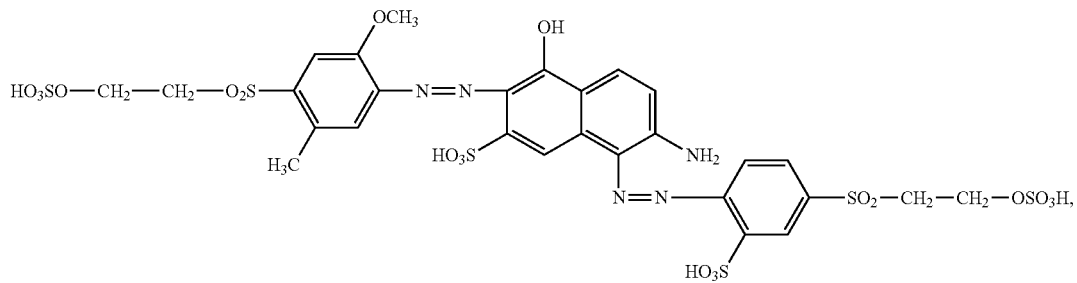
(10e)
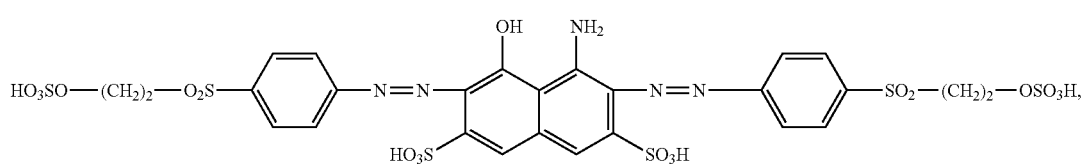
(10f)
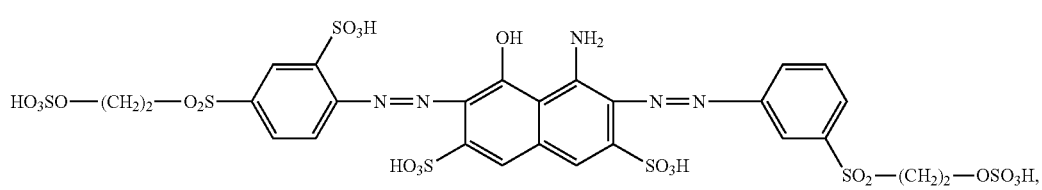
(10g)
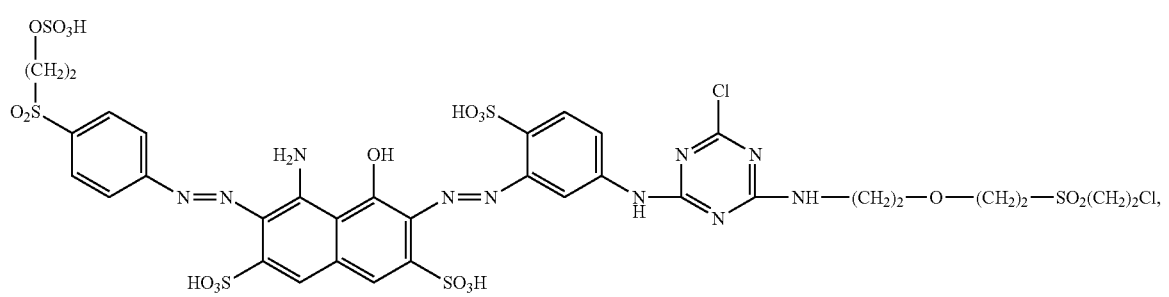
(10h)
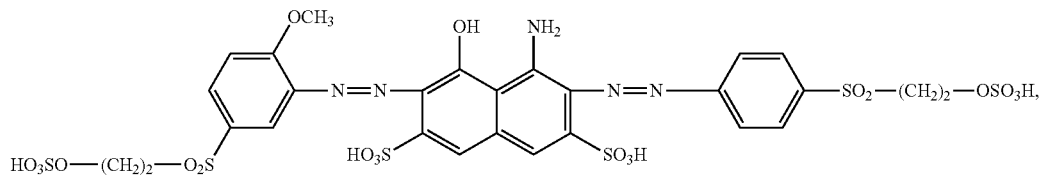
(10i)
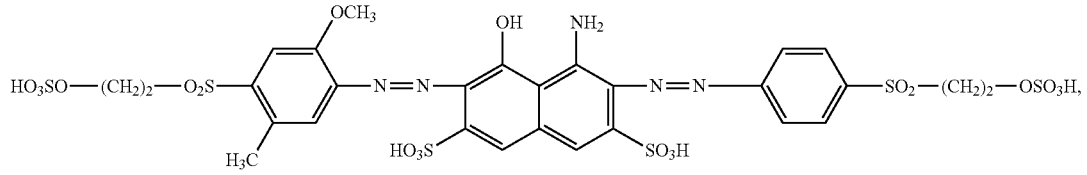
(10j)
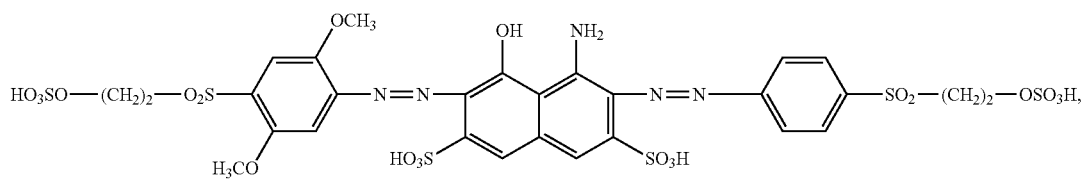
(10k)

(10l)
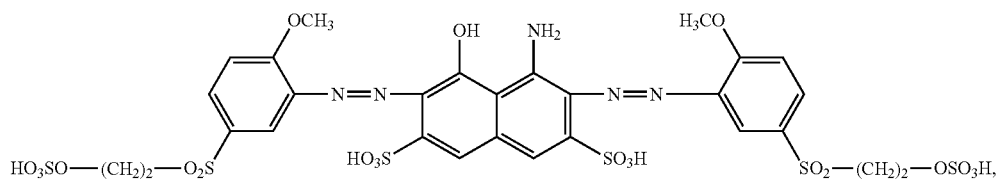
(10m)
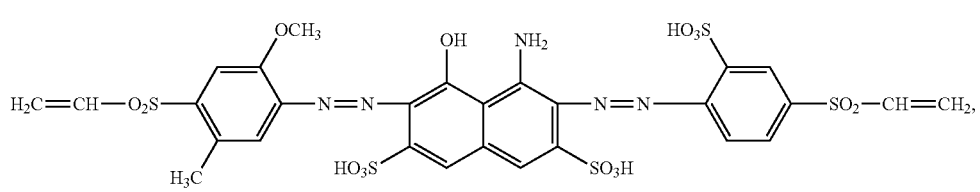
(10n)
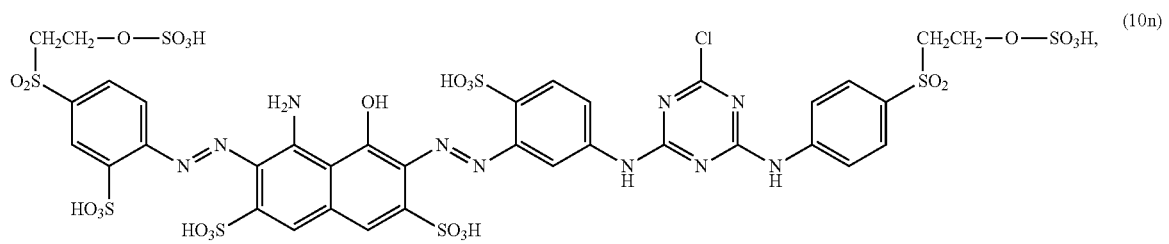
(10o)
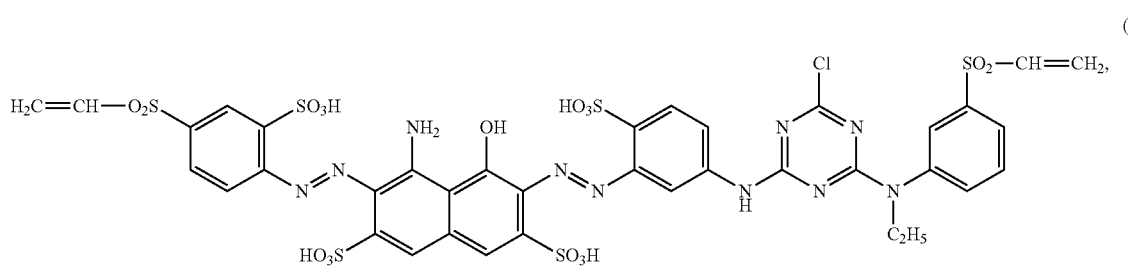
(10p)
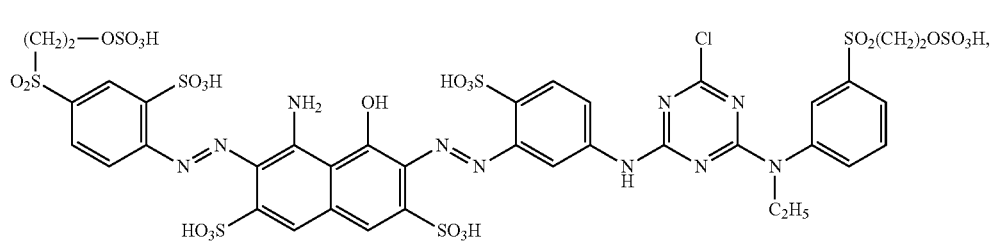
(10q)
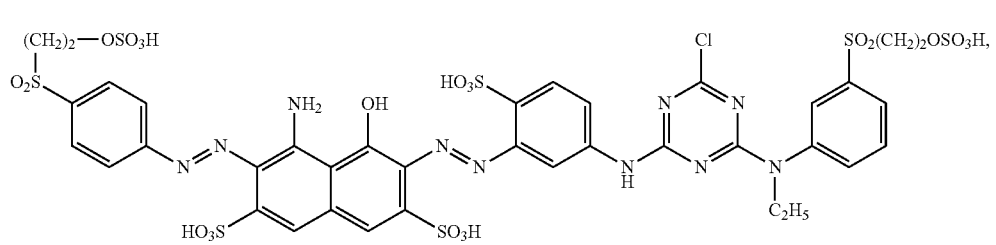
(10r)
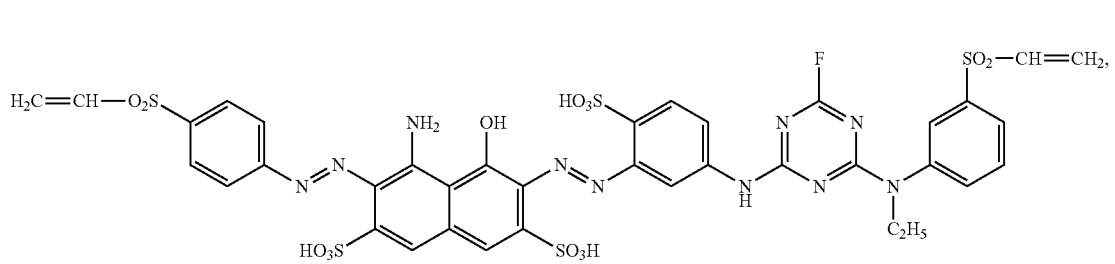

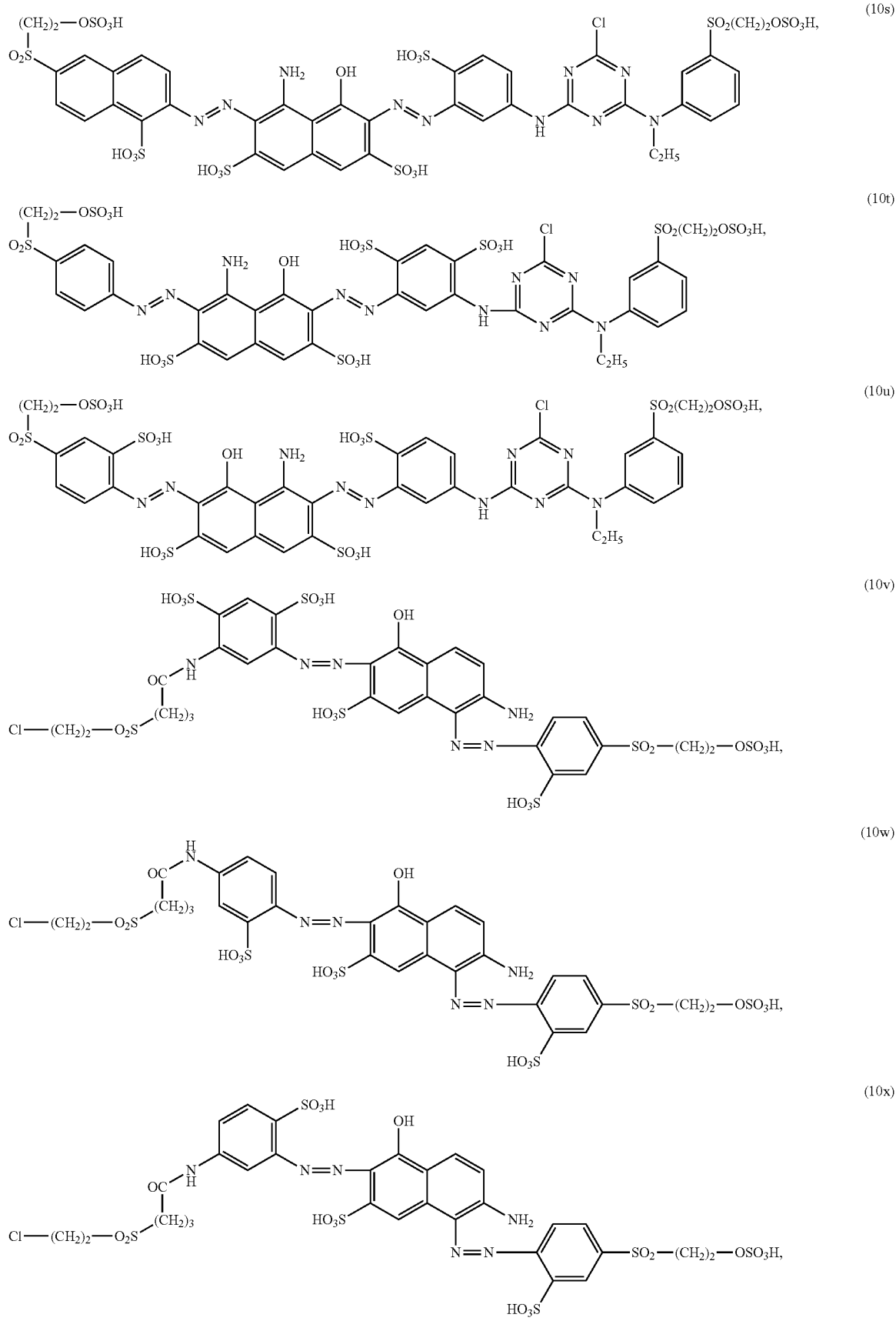

-continued
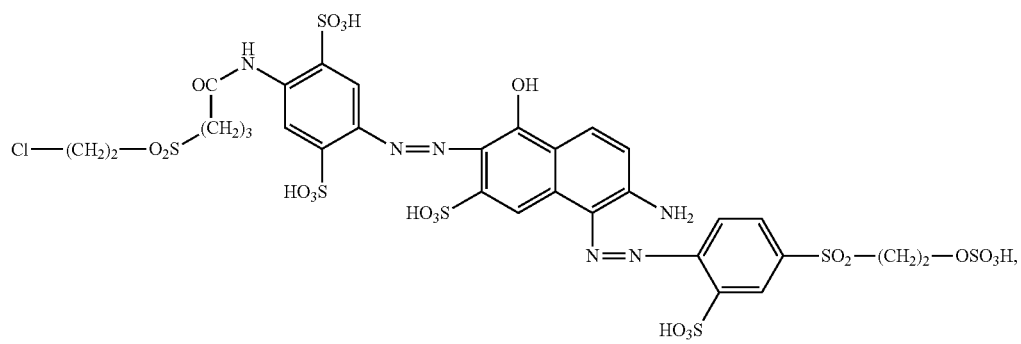
(10y)
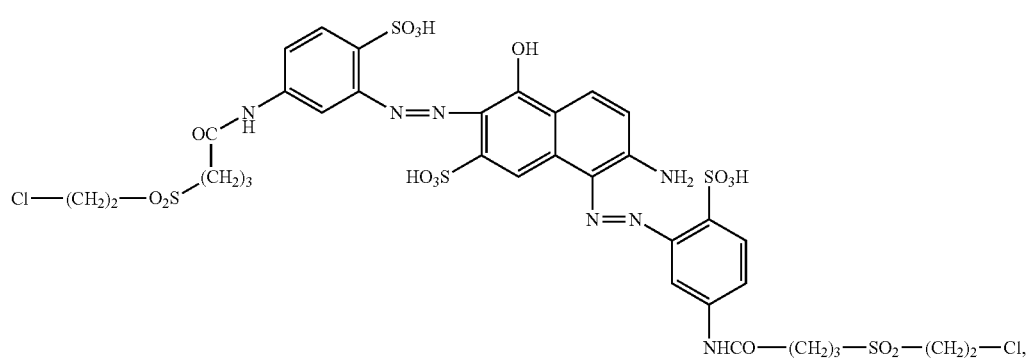
(10z)
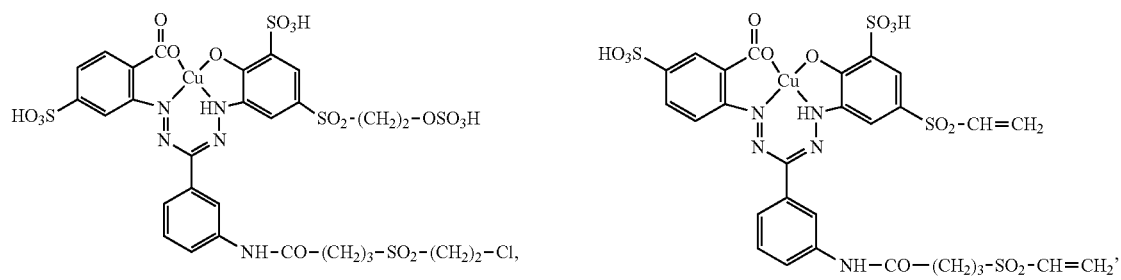
(11a) (11b)
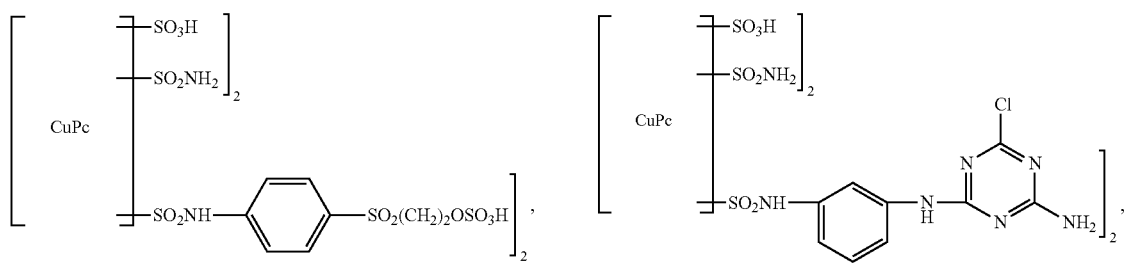
(12a) (12b)

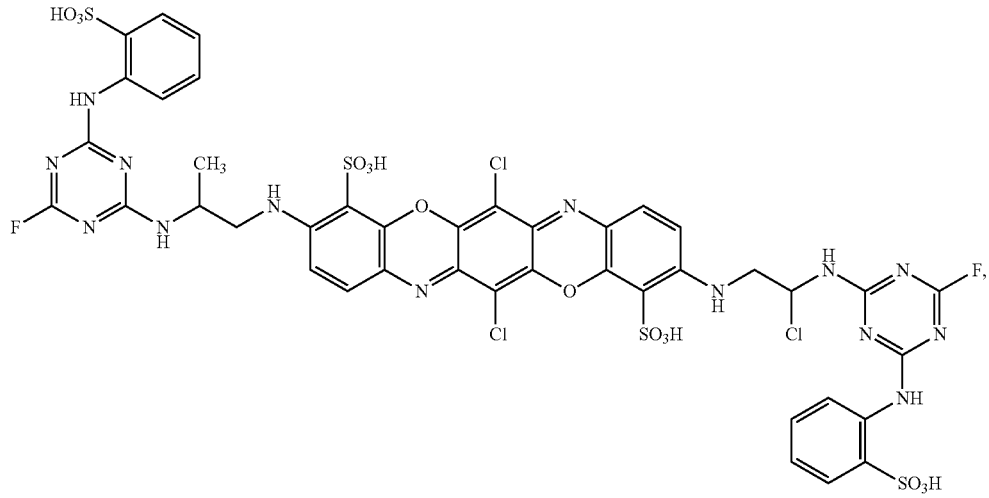
(13a)
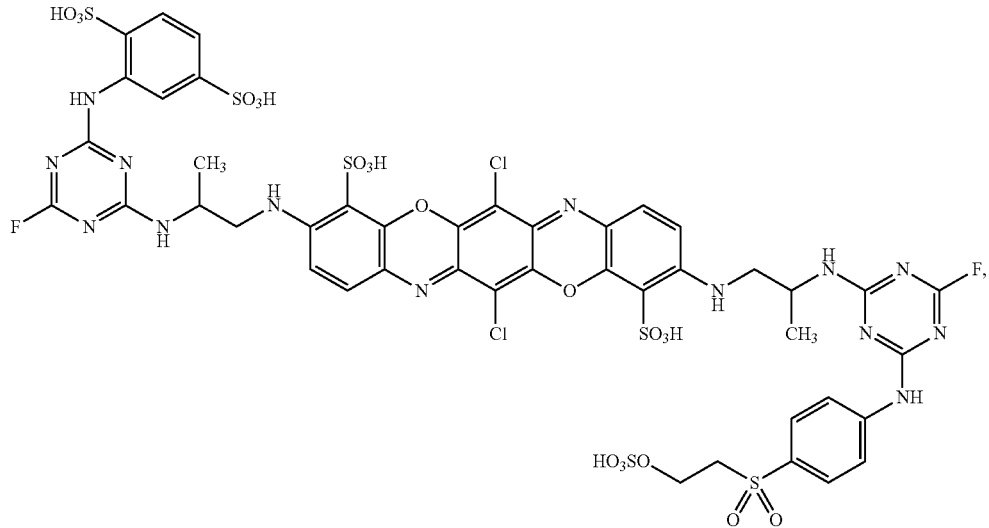
(13b)
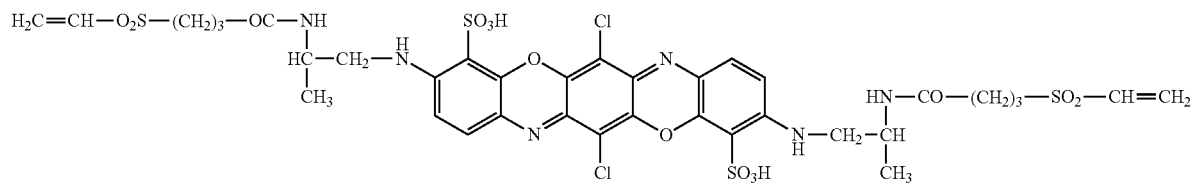
(13c)
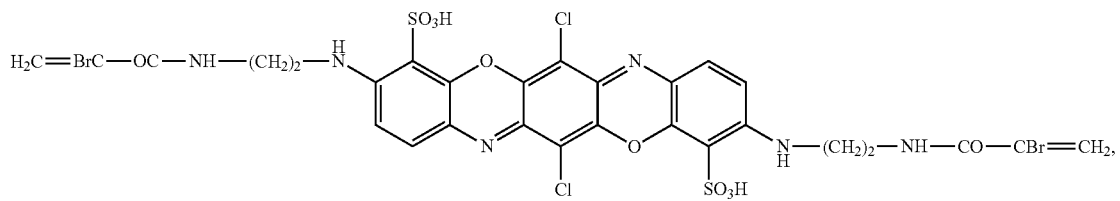
(13d)

(13e)
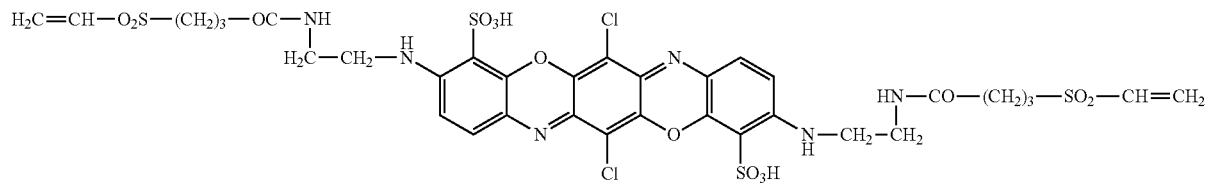
(13f)
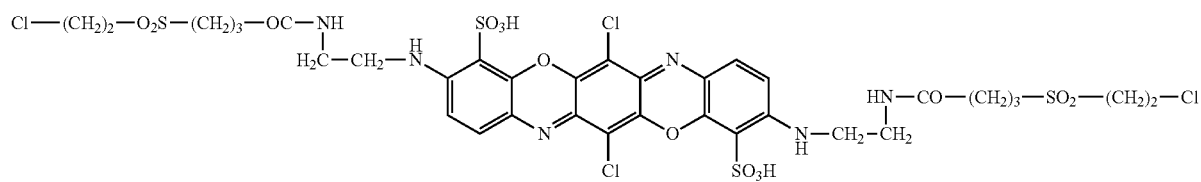
(201)
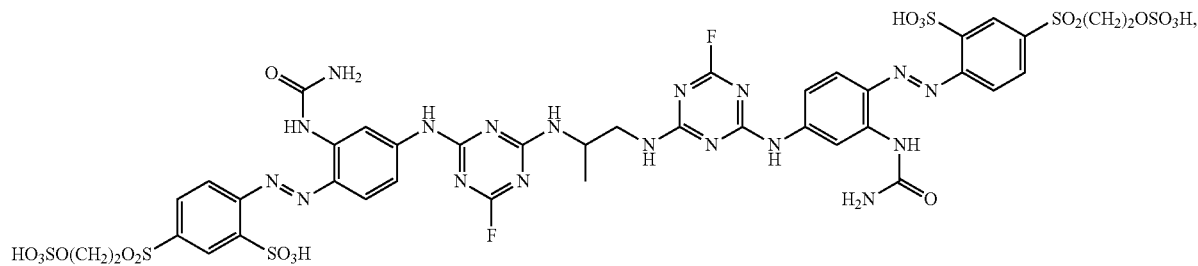
(202)
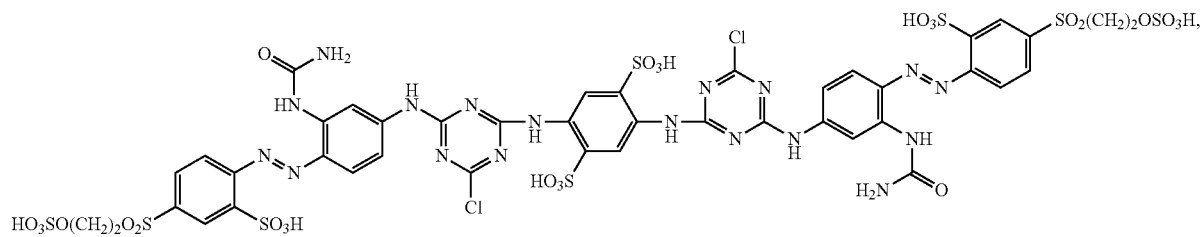
(203)
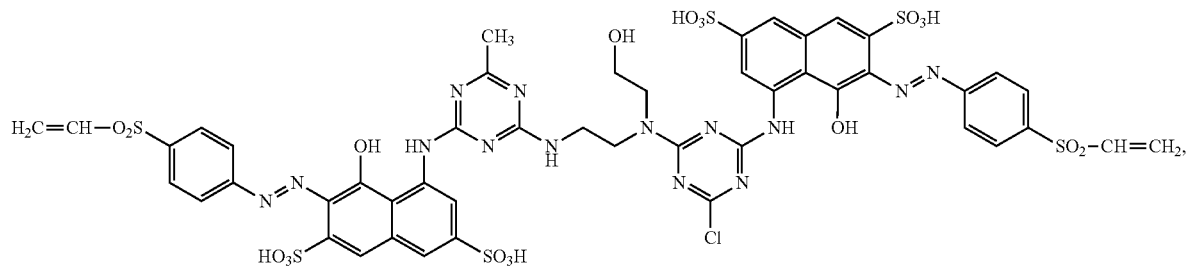
(204)
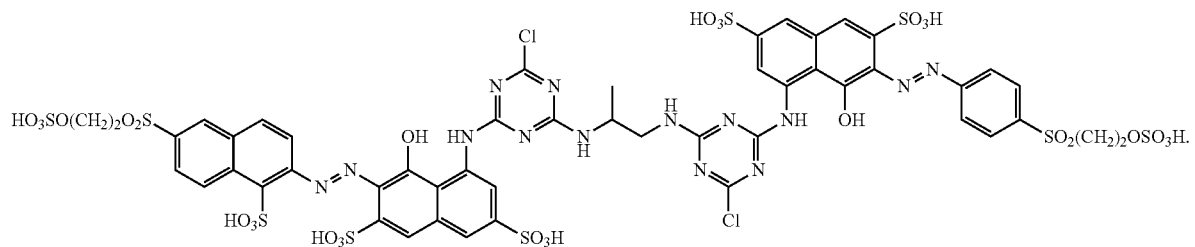

In a particularly preferred embodiment of the present invention the dyes of formulae (6a), (6b), (9a), (9b), (9c), (9m), (9n), (10a), (10b), (10c), (10d), (10e), (10f), (10g), (10o), (10p), (10u), (10w), (10x), (10y), (10z) and (202) are used.

According to another embodiment, the process of the present invention is conducted with at least one reactive dyestuff of formula

$$A_{1a}\text{-}(Z_1)_{2\text{-}3} \quad (1a)$$

together with at least one reactive dyestuff of formula

$$A_{1b}\text{-}(Z_1)_2 \quad (1b),$$

wherein $A_{1a}$ is a radical of formula (9), $A_{1b}$ is a radical of formula (10), $Z_1$ independently denotes 2 or 3 identical or different fiber reactive radicals of formula (3a) or (3b), preferably a radical of formula (3a), in which the radicals of formulae (3a), (3b), (9) and (10) are as defined and preferred above, to obtain, for example, black dyed/tanned leather or leather like materials.

The reactive dyes of formulae (1) and (2) are either in the form of the free acid or, preferably, in the form of a salt thereof. Salts that come into consideration are, for example, the alkali metal, alkaline earth metal and ammonium salts or the salts of an organic amine. Sodium, lithium, potassium and ammonium salts and the salts of mono-, di- and tri-ethanolamine, preferably, sodium and potassium salts may be mentioned as examples.

The reactive dyes of formulae (1) and (2) are known or can be obtained analogously to known compounds, e.g. by customary diazotisation, coupling and condensation reactions. Polyazo dyes of formula (9) are described, for example, in U.S. Pat. No. 6,160,101 and U.S. Pat. No. 5,817,779. Polyazo dyes of formula (10) are described, for example, in DE-A 960 534 (pages 6 and 7), WO-A 2012 136 428, EP-A 1 608 708, U.S. Pat. No. 6,537,332 and U.S. Pat. No. 4,622,390. Formazan dyes of formula (11) are described, for example, WO-A 2017 129 297. Dioxazine dyes of formula (13) are described, for example, U.S. Pat. No. 5,772,698 and U.S. Pat. No. 7,905,928. The said fiber reactive dyes are well known in the art of textile dyeing.

In one embodiment the process of the present invention is conducted in aqueous liquor. The term aqueous liquor is meant to include a pure water based processing liquor, or a partial water/solvent based system, wherein the solvent is, for example, an organic solvent that is miscible or non-miscible with water. In a certain embodiment the aqueous liquor is water without any solvent.

Instead of an aqueous liquor other non-aqueous liquors may come into consideration, for example, a full solvent based system that can be recycled, eutectic solvents, for example, choline chloride, or supercritical liquids, for example, supercritical $CO_2$. Non-aqueous systems are attractive, because of reduced hydrolysis and, particularly, the avoidance of aqueous waste production.

The pH of the aqueous liquor customarily does not exceed pH 10, preferably 9.5, although it may exceed pH 10 under certain circumstances and reach, for example, pH 12.6. According to a certain embodiment, the process of the present invention comprises treatment of the collagen containing fibrous material in an aqueous liquor at a pH of from 7 to 10. More particularly, the liquor pH is in the range of from 8 to 9.5, especially 8.5 to 9.1. At alkaline pH the dyestuff covalently fixes to the collagen fibers and simultaneously crosslinks and dyes the collagen matrix.

Basically, any desired alkalis and buffer systems can be used to adjust the pH of the aqueous liquor containing the collagen containing fibrous material and the dyestuff. Examples are alkali metal carbonates and bicarbonates such as sodium carbonate (soda ash), potassium carbonate and sodium bicarbonate, also alkali metal hydroxides such as sodium hydroxide, for example, as an aqueous solution, sodium metasillicate, pyrophosphates such as sodium pyrophosphate or potassium pyrophosphate, tripotassium phosphate, trisodium phosphate, trisodium citrate, tripotassium citrate, sodium edate, tetrasodium EDTA, borax/aqueous sodium hydroxide solution buffer and phosphate buffer. Preferred are sodium bicarbonate, soda ash and sodium hydroxide, especially sodium bicarbonate and soda.

The temperature required to achieve crosslinking and dyeing are advantageously not more than 50° C., especially not more than 45° C., and more preferably not more than 40° C. Advantageously, the temperature is in the range of from 20 to 50° C., preferably of from 25 to 45° C., and especially of from 25 to 40° C.

The collagen containing fibrous material is suitably treated for a period, for example, of from 0.5 to 12 hours, depending on pH and temperature. Especially at higher pH values in the range of from 8 to 9.5 the required treatment time is in the range of from 0.5 to 8 hours.

Untanned hide or skin tends to swell to a varying extend as it moves away from the iso-electric point. Swelling is created through repulsion within the collagen fibers. Simultaneous tanning and dyeing according to the process of the present invention is suitably conducted in the presence of at least one inorganic salt, for example, sodium chloride, potassium chloride, sodium sulphate (Glauber salt) and potassium sulphate, preferably sodium sulphate and potassium sulphate, to control or suppress the swelling, for example, by adding the inorganic salt to the aqueous liquor.

When conducting the process of the present invention, the swelling of the hide or skin may likewise be controlled or suppressed by adding to the aqueous liquor at least one salt of a carboxylic acid. The at least one salt of a carboxylic acid may be applied in place of the at least one inorganic salt indicated above or, alternatively, in combination or in admixture with the at least one inorganic salt indicated above. Suitable salts of carboxylic acids are selected from the group of, for example, sodium formate, sodium acetate, disodium adipate, trisodium citrate, disodium ethylenediaminetetraacetic acid (EDTA), tetrasodium ethylenediaminetetraacetic acid (EDTA), tetrasodium N,N-bis(carboxylatomethyl)-glutamate, disodium fumarate, disodium glutarate, disodium maleate, disodium malonate, trisodium nitrilotriacetate, disodium succinate and disodium oxalate, preferably sodium formate and tetrasodium ethylenediaminetetraacetic acid (EDTA). Likewise, the potassium salts or other suitable salts come into consideration for conducting the process of the present invention in place of the sodium salts of the indicated salts of carboxylic acids.

In a certain embodiment the process of the present invention is conducted in the presence of a mixture of sodium sulphate (Glauber salt) and sodium formate or tetrasodium ethylenediaminetetraacetic acid (EDTA).

The liquor used for treatment of the collagen containing fibrous material with at least one reactive dyestuff selected from the group of formula (1) and (2) may include other customary acid or direct dyes, which, generally, do not contribute to the tanning effect. The liquor may also include other customary reactive dyes. The fraction of the other customary dyes is in the range, for example, of from 0.5 to 50% by weight, preferably of from 1 to 20% by weight based on the total amount of the dyestuffs in the liquor.

The amount of dyestuff is customarily at least 0.5% by weight, frequently at least 1.0% by weight, and especially 2% by weight, based on the pickle weight of the collagen containing fibrous material used. In a particular embodiment the amount of dyestuff is at least 3% by weight based on the pickle weight of the collagen containing fibrous material. The dye will generally be used in an amount of up to 15% by weight based on the pickle weight of the collagen containing fibrous material. Advantageously, the amount of dyestuff used in accordance with the process of the present invention is in the range of from 0.5% to 15%, preferably of from 1.0% to 10%, especially of from 2% to 8%, based on the pickle weight of the collagen containing fibrous material used. Based on the dry weight of the collagen containing fibrous material, the amount of dyestuff is suitably of from 1.0% to 50%, preferably of from 3% to 30%, and especially of from 5% to 20%.

Appropriately, the amount of process chemicals used in the manufacturing of leather is quantified by reference to the weight of the hide. However, the water content of the hide and hence its weight is known to vary during each of the different process steps, for example, curing, soaking, painting, liming, fleshing, deliming, bating, pickling, degreasing, and tanning. Accordingly, the amount of process chemicals may be referred to the dry weight of the collagen containing fibrous material. Alternatively, it may be referred to the weight of the hide after a certain process step, for example, the collagen containing fibrous material after pickling, that is the pickle weight of the collagen containing fibrous material, as given above. After pickling a hide typically consists of about 30% of collagen and about 70% of water, based on the weight of the hide.

The liquor may also include customary anionic dyeing assistants, nonionic surface-active substances and also tanning materials customarily used for retanning, for example polymeric retanning materials, synthetic retanning materials, vegetable retanning materials and fatliquors. Retanning is suitably carried out in the same bath or, preferably, in a separate bath subsequenty to the treatment of the collagen containing material in accordance with the process of the present invention (dyeing/tanning).

Typically, the process according to the present invention is carried out stepwise, by treating the collagen containing fibrous material, in a first step, with the dye-containing liquor at below pH 7, for example at pH 5.0 to 5.5. In an interesting embodiment, the treatment with the dye-containing liquor as the first step is carried out at slightly above pH 7, for example at pH 7.5 to 8.5 or pH 8.0 to 8.5. This step serves to distribute the dyestuff uniformly in the collagen containing fibrous material cross-section, which is important in case of thicker hides and skins. Subsequently, in the second step, the dye is fixed in the above-described manner at pH values of at least 8, for example in the range of from 8 to 9.5, especially of from 8.5 to 9.1. It is also possible to carry out the dyeing in a one step process without the fixation step being preceded by a distribution step.

Generally, the dyes exhaust well from the liquor and the fixation yield is high, that is the dyestuff is almost quantitatively exhausted from the liquor and fixed to the collagen, and a wash is not absolutely necessary. Suitably, a wash of the dyed and tanned material is carried out after the dyeing/tanning operation in order to remove remaining chemically unfixed dyestuff. A subsequent wash step is carried out by rinsing the dyed/tanned material with water one or more times, for example 1 to 4 times. The amount of water is generally in the range, for example, of from 100% to 500% based on the weight of the collagen material, for example, its pickle weight. The duration of a single wash step will be typically in the range of from 5 to 60 min and especially in the range of from 10 to 30 min at a temperature of from 20 to 35° C. Advantageously, washing is carried out in the presence of a commercial soaping or afterclearing agent, for example, ERIOPON® WFE of Huntsman. Suitably, a small amount of acid, for example, formic acid, is added to the wash water of the first wash step to reduce the pH of the collagen material to about pH 7.5 prior to the second wash with the soaping agent. It is preferable for one or more of the washing steps described above to be carried out before retanning and fatliquoring. Advantageously, the pH of the collagen material is brought to about pH 5.5 to 6 after washing and prior to further processing.

The dyeing/tanning and retanning operation is generally followed by a fatliquoring operation in order that the leather be adjusted to desired haptic properties. However, retanning and fatliquoring can also be carried out in one process step. The fatliquoring step can be carried out at any stage of the wet end operation and is preferably carried out at the end of the wet end operation.

In general, not only the fatliquoring but also the retanning is fixed at the end of the operation by acidification, i.e. a final acidification takes place after dyeing/tanning and any retanning and fatliquoring. Typically, for acidification, the pH of the aqueous treatment bath is adjusted to a value of from 3.0 to 3.5 by addition of an acid, for example, formic acid.

Treatment of the collagen containing fibrous material in accordance with the process of the present invention, retanning, fatliquoring and any aftertreatment is affected in a conventional manner, for example, in a drum, or in a paddle. Such processes are extensively described.

The collagen containing material dyed and tanned according to the process of the invention yields a leather or a leather imitation showing an excellent fastness level even at very high depth of shade. Rubfastnesses and especially wash-, perspiration- and migration fastnesses are particularly good, which is very difficult if not impossible to achieve in the case of conventionally dyed leathers. The leather obtained according to the process of the present invention exhibits an increased hydrothermal stability, and substantially no staining of the contact material in migrationfastness tests even at high humidity and high temperatures. Accordingly, another object of the present invention is the product obtained by the process of the present invention, that is the leather or a leather imitation.

The leather or leather imitation, such as bonded leather fiber, obtained in accordance with the process of the present invention can be used for the manufacture of any leather or leather-like articles, for example, in the footwear, apparel, automotive, aviation, handwear, handheld communication- and computer device, and furniture industry. The haptic, mechanical and physical properties required for the particular leather or leather-like article can be achieved in a conventional manner through a treatment with auxiliaries, fatliquors, hydrophobicizers and retanning materials that is required for the particular article. Light fastness can be increased through a treatment with customary UV-absorber, for example, UV-Fast® W LIQ of Huntsman. Accordingly, still another object of the present invention is the use of the leather or the leather imitation obtained by the process of the present invention for the manufacture of leather or leather-like articles, for example, car seats, car instrument panels, door linings and ceilings, shoes, gloves, jackets, trousers, motorcycle wear, bags, accessories, luxury leather goods, covers for handheld communication- and computer devices, chairs and couches.

The following Examples serve to illustrate the invention. Unless otherwise indicated, the temperatures are given in degrees Celsius, parts are parts by weight and percentages relate to percent by weight. Parts by weight relate to parts by volume in a ratio of kilograms to litres. All percentages given below are based upon the pickle weight of the raw material, for example, the pelt, hide or skin.

Methods:

The hydrothermal stability of the dyed and tanned leather is tested by a Leather Shrinkage Temperature Indicator machine (Ionic Instruments 1978 Ltd) which is based upon the method SLP 18 (IUP/16; BS 3144:method 17) designated by the Society of Leather Technologists and Chemists (SLTC). Colour Fastness to Water and Perspiration are tested in accordance with SLF 412 (IUF 421) and SLF 426 (IUF 426), respectively

EXAMPLE 1

Tanning and Dyeing:

Though it would not be typical to start from the pickle for conducting the process of the present invention, the pickled product is used, as pelt can be held in a preserved state at this point. The pickled goatskin is neutralized with 150% of a NaCl solution (8%) in water containing 0.15% of Eusapon® OC (degreasing agent of BASF) and 1.5% of sodium bicarbonate and run overnight. The pH of the liquor is in the range of 5.0 to 5.4. The pickled goatskin thus treated is drained, washed two times with 100% of water at pH 5.0 to remove sodium chloride used for depickling the skin and the loosened natural grease, other salts and proteinous debris which is loose in the structure. The washed goatskin is introduced into a drum containing 30% of water at a temperature of 30° C., the pH is adjusted to pH 5.0 and 3% of a dye mixture are added containing 81 parts of the dye of formulae (10 g) and 19 parts of the dye of formula (9b). The drum is operated for 90 minutes to achieve dye penetration. Subsequently, 8% of sodium sulphate are added and the drum is operated for another 30 minutes. Afterwards, aqueous solutions of sodium carbonate (soda ash) and sodium bicarbonate are added stepwise as follows: (i) 0.5% of sodium bicarbonate in 5% of water, run drum for 10 minutes; (ii) 0.5% of sodium bicarbonate in 5% of water, run drum for 10 minutes; (iii) 0.25% of sodium carbonate in 5% of water, run drum for 10 minutes; (iv) 0.25% of sodium carbonate in 5% of water, run drum for 10 minutes; (v) 0.25% of sodium carbonate in 20% of water, run drum for 10 minutes. Then, the temperature of the liquor is increased to 40° C. The pH is maintained at 8.8 to 9.0 by periodically checking and adjusting with sodium carbonate. The drum is operated for another 6 hours. The goatskin thus treated is drained, washed with 100% of water at 35° C. for 20 minutes with two additions of 1% of formic acid (10% solution) to drop the pH to 7.5. The treated and washed goatskin is then subjected to a wash step with an aqueous bath containing ERIOPON® WFE for 20 minutes, drained, and washed with fresh water for 10 minutes. The goatskin thus treated is allowed to age for 24 hours. A black dyed and tanned leather is obtained which exhibits a hydrothermal stability of 84° C. and a fastness to water and fastness to perspiration of 5.

Retanning:

The dyed and tanned leather is immersed in 150% of water at 45° C. and three portions of formic acid are added to adjust a pH of 5.2 to 5.5. The leather thus treated is drained and washed, and then immersed in 75% of water at 40° C. 8% of a commercially available sulphone based syntan are added, and the immersed leather is treated for 30 minutes, followed by the addition of 10% of commercially available anionic fatliquors and further treatment for 60 minutes. Formic acid is successively added over a period of 55 minutes to yield a pH of 3.0 to 3.3. Treatment is continued at this pH for further 30 minutes. The product is drained and washed in a clean liquor, then drained and stored for 24 hours prior to drying.

EXAMPLES 2 to 14

The procedure of Example 1 is repeated except that the amount of a dyestuff or a dye mixture as given in Examples 2 to 14 is used instead of 3% of the dye mixture given in Example 1.

Example 2: 3% of a dye mixture containing 67 parts of the dye of formulae (10f), 17 parts of the dye of formula (9m) and 16 parts of a mixture of the dyes of formulae (10a), (10b), (10c) and (10d). A black dyed and tanned leather is obtained which has a hydrothermal stability of 83° C.

Example 3: 3% of a dye mixture containing 74 parts of the dye of formulae (10f), 15 parts of the dye of formula (9a) and 11 parts of the dye of formula (10e). A black dyed and tanned leather is obtained which has a hydrothermal stability of 82° C.

Example 4: 3% of a dye mixture containing 78 parts of the dye of formulae (10f) and 22 parts of the dye of formula (9a). A black dyed and tanned leather is obtained which has a hydrothermal stability of 85° C.

Example 5: 3% of a dye of the formula (9b). An orange to orange-brown dyed and tanned leather is obtained which has a hydrothermal stability of 85° C.

Example 6: 3% of a dye of the formula (10x). A scarlet dyed and tanned leather is obtained which has a hydrothermal stability of 86° C.

Example 7: 3% of a dye of the formula (6a). A red dyed and tanned leather is obtained which has a hydrothermal stability of 84° C.

Example 8: 3% of a dye of the formula (202). A yellow dyed and tanned leather is obtained which has a hydrothermal stability of 86° C.

Example 9: 3% of a dye of the formula (10e). A red dyed and tanned leather is obtained which has a hydrothermal stability of 79° C.

Example 10: 3% of a dye of the formula (9m). An orange dyed and tanned leather is obtained which has a hydrothermal stability of 80° C.

Example 11: 3% of a dye of the formula (9a). An orange to orange-brown dyed and tanned leather is obtained which has a hydrothermal stability of 80° C.

Example 12: 3% of a dye of formula (10f). A navy-black dyed and tanned leather is obtained which has a hydrothermal stability of 82° C.

Example 13: 3% of a dye of formula (10g). A navy dyed and tanned leather is obtained which has a hydrothermal stability of 83° C.

Example 14: 3% of a dye of formula (10o). A navy dyed and tanned leather is obtained which has a hydrothermal stability of 81° C.

EXAMPLE 15

Tanning and Dyeing:

Pickled goatskin is neutralized with 150% of a NaCl solution (8%) in water containing 1.5% of sodium bicarbonate and run overnight. The pH of the liquor is in the range of 5.4 to 5.6. The pickled goatskin thus treated is drained, washed two times with 100% of water at pH 5.5 to remove sodium chloride used for depickling the skin and the loosened natural grease, other salts and proteinous debris which is loose in the structure. The washed goatskin is introduced into a drum containing 30% of water at a temperature of 30° C., the pH is adjusted to pH 5.5, and 3.5% of a dye mixture are added containing 81 parts of the dye of formulae (10g) and 19 parts of the dye of formula (9b). The drum is operated for 90 minutes to achieve dye penetration. Subsequently, 8% of tetrasodium ethylenediaminetetraacetic acid (EDTA) are added and the drum is operated for another 30 minutes. Afterwards, aqueous solutions of sodium carbonate (soda ash) and sodium bicarbonate are added stepwise as follows: (i) 3% of sodium bicarbonate in 15% of water are added in multiple additions over 30 minutes, and (ii) 2% of sodium carbonate in 15% of water are added in multiple additions over 30 minutes. Then, the temperature of the liquor is increased to 35° C. The pH is maintained at 8.9 to 9.1 by periodically checking and adjusting with sodium carbonate. The drum is operated for another 8 hours. The goatskin thus treated is drained, washed with 150% of water at 40° C. for 20 minutes, and drained, washed again with 100% of water with an addition of 1.5% of citric acid and 1.0% trisodium citrate for 30 minutes to drop the pH to approximately 6.0. The treated and washed goatskin is then subjected to a final drain, wash step with 100% of water for 15 minutes. The goatskin thus treated is allowed to age for 24 hours. A black dyed and tanned leather is obtained which exhibits a hydrothermal stability of 84° C.

Retanning:

The dyed and tanned leather is immersed in 75% of water at 50° C. and 8% of a commercially available sulphone based syntan are added. The immersed leather is treated for 30 minutes, followed by the addition of 1% of a commercially available filling agent and 10% of commercially available anionic fatliquors suitable for highly anionic leather. Treatment is continued for 45 minutes. Fixation of these agents is accomplished by adding portions of formic acid over a period of 120 minutes to adjust a pH of 3.0 to 3.3. Treatment is continued for another 30 minutes. The leather thus treated is drained and washed for 15 minutes with 100% of water at 50° C. Afterwards, the leather is drained and treated for 30 minutes at 30° C. by adding 75% of water and 1% of ALBAFIX® ECO of Huntsman. The product is drained and stored for 24 hours prior to drying.

EXAMPLE 16

Tanning and Dyeing:

Pickled bovine hide is neutralized with 150% of a NaCl solution (8%) in water containing 3% of sodium bicarbonate and run overnight. The pH of the liquor is in the range of 6.8 to 7.0. The pickled bovine hide thus treated is drained, washed two times with 100% of water at pH 5.5 to remove sodium chloride used for depickling the hide and the loosened natural grease, other salts and proteinous debris which is loose in the structure. The washed bovine hide is then further treated in a fresh float of 100% water and 2% sodium bicarbonate and run for a period of 3 hours in order to gain a pH of 7.8 to 8.0 through the cross-section of the hide. The treated bovine hide is then drained and washed once with 100% water to remove the alkaline sodium bicarbonate, but still leave the bovine hide at pH8.0. The bovine hide is then introduced into a drum containing 15% of water at a temperature of 35° C., and 4.75% of a dye mixture are added containing 75 parts of the dye of formulae (10g) and 25 parts of the dye of formula (9b). The drum is operated for 90 minutes to achieve dye penetration. Subsequently, 5% of sodium sulfate and 2.5% of sodium formate are added and the drum is operated for another 30 minutes. Afterwards, aqueous solutions of sodium carbonate (soda ash) and sodium bicarbonate are added stepwise as follows: (i) 2% of sodium bicarbonate in 15% of water are added in multiple additions over 30 minutes, and (ii) 1% of sodium carbonate in 15% of water are added in multiple additions over 30 minutes. The pH is maintained at 8.9 to 9.1 by periodically checking and adjusting with sodium carbonate. The drum is operated for another 8 hours. The bovine hide thus treated is drained, washed with 150% of water and 3% sulfuric acid at 40° C. for 20 minutes to reduce the pH to 7.0 to 7.2, and drained, washed again with 100% of water with an addition of 0.5% sulfuric acid for 30 minutes to drop the pH to approximately 6.0. The treated and washed hide is then subjected to a final drain, wash step with 100% of water for 15 minutes. The hide thus treated is allowed to age for 24 hours. A black dyed and tanned leather is obtained which exhibits a hydrothermal stability of 80° C.

EXAMPLE 17

Tanning and Dyeing:

This example 17 demonstrates the processing as if the hide or skin were beginning the process after the bating stage, wherein the hide or skin already has a cross-sectional pH of 8.0 and is free of any divalent cations or other species that could interfere in the tanning process. The bovine hide is introduced into a drum containing 15% of water at a temperature of 35° C., and 4.5% of a dye mixture are added containing 78 parts of the dye of formulae (10g) and 22 parts of the dye of formula (9b). The drum is operated for 90 minutes to achieve dye penetration. Subsequently, 5% of sodium sulfate and 2.5% of sodium formate are added and the drum is operated for another 30 minutes. Afterwards, aqueous solutions of sodium carbonate (soda ash) and sodium bicarbonate are added stepwise as follows: (i) 1.5% of sodium bicarbonate in 15% of water are added in multiple additions over 30 minutes, and (ii) 1% of sodium carbonate in 15% of water are added in multiple additions over 30 minutes. The pH is maintained at 8.9 to 9.1 by periodically checking and adjusting with sodium carbonate. The drum is operated for another 8 hours. The bovine hide thus treated is drained, washed with 150% of water and 3% sulfuric acid at 40° C. for 20 minutes to reduce the pH to 7.0 to 7.2, and drained, washed again with 100% of water with an addition of 0.5% of a commercial soaping or afterclearing agent, for example, ERIOPON® WFE of Huntsman, for 30 minutes. The treated and washed hide is then subjected to a final drain, wash step with 100% of water for 15 minutes. The hide thus treated is allowed to age for 24 hours. A black dyed and tanned leather is obtained which exhibits a hydrothermal stability of 80° C.

Retanning for Methods 16 and 17:

The dyed and tanned leather is immersed in 50% of water at 30° C. and 4% of a commercially available sulphone or diphenyl based syntan are added and 4% of commercially available vegetable tanning material, e.g. Tara. The immersed leather is treated for 30 minutes, followed by the addition of 3% of a commercially available filling agent and 15% of commercially available anionic fatliquors suitable for highly anionic leather with a further offer of 50% water at 50° C. Treatment is continued for 45 minutes. Fixation of these agents is accomplished by adding portions of formic acid over a period of 60 minutes to adjust a pH of 3.0 to 3.3. Treatment is continued for another 30 minutes. The leather thus treated is drained and washed for 15 minutes with 100% of water at 50° C. The product is drained and stored for 24 hours prior to drying.

What is claimed is:

1. A process for the simultaneous tanning and dyeing of collagen containing fibrous material, the process comprising
   treating a collagen containing fibrous material with an aqueous liquor comprising at least one reactive dyestuff, wherein the aqueous liquor has a pH less than a pH required to fix the at least one reactive dyestuff, and wherein treating comprises distributing the at least one reactive dyestuff throughout a thickness of the material; and
   increasing the pH of the aqueous liquor to simultaneously tan the fibrous material by crosslinking the fibrous material and fix the dye to the fibrous material, wherein the at least one reactive dyestuff is selected from the group of formula (1) and (2)

$$A_1\text{---}(Z_1)_{2\text{-}3} \quad \text{and} \tag{1}$$

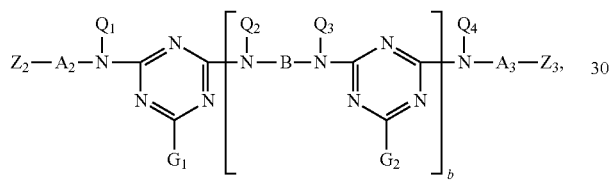
(2)

wherein
- $A_1$, $A_2$ and $A_3$ are each independently of the others the radical of a monoazo, polyazo, metal-complexed azo, anthraquinone, phthalocyanine, formazan or dioxazine chromophore having at least one sulfo group,
- B is an organic bridge member,
- $Q_1$, $Q_2$, $Q_3$ and $Q_4$ are each independently of the others hydrogen or unsubstituted or substituted $C_1$-$C_4$ alkyl,
- $G_1$ und $G_2$ are halogen, 3-carboxypyridin-1-yl or 3-carbamoylpyridin-1-yl,
- $(Z_1)_{2\text{-}3}$ is 2 to 3 identical or different fiber reactive radicals,
- $Z_2$ and $Z_3$ are each independently of the other identical or different fiber reactive radicals, and b is the number 0 or 1 wherein the process does not include chrome, vegetable and aldehyde tanning agents.

2. A process according to claim 1, wherein
$Z_1$, $Z_2$ and $Z_3$ are each independently of the others a radical of the formula $$\text{---SO}_2\text{---Y}, \tag{3a}$$

$$\text{---NH---CO---(CH}_2)_l\text{---SO}_2\text{---Y}, \tag{3b}$$

$$\text{---CONR}_2\text{---(CH}_2)_m\text{---SO}_2\text{---Y}, \tag{3c}$$

$$\text{---NH---CO---CH(Hal)---CH}_2\text{-Hal}, \tag{3d}$$

$$\text{---NH---CO---C(Hal)}\text{=}\text{CH}_2, \tag{3e}$$

-continued

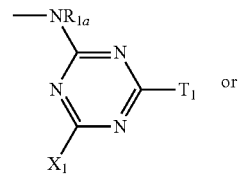
(3f)

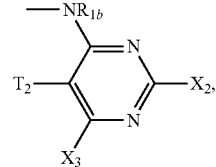
(3g)

in which
Hal is chlorine or bromine;
$X_1$ is halogen, 3-carboxypyridin-1-yl or 3-carbamoylpyridin-1-yl;
$T_1$ independently has the meaning of $X_1$, or is a substituent which is not fiber reactive, or is a fiber reactive radical of the formula

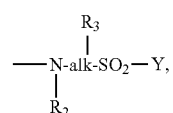
(4a)

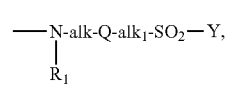
(4b)

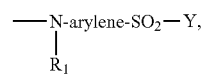
(4c)

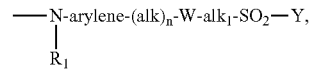
(4d)

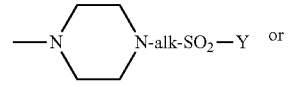
(4e)

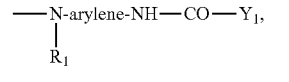
(4f)

in which
$R_1$, $R_{1a}$ and $R_{1b}$ independently of one another are each hydrogen or $C_1$-$C_4$ alkyl,
$R_2$ is hydrogen, $C_1$-$C_4$ alkyl which is unsubstituted or substituted by hydroxyl, sulfo, sulfato, carboxyl or cyano or a radical

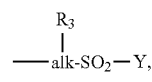

$R_3$ is hydrogen, hydroxyl, sulfo, sulfato, carboxyl, cyano, halogen, $C_1$-$C_4$ alkoxycarbonyl,
$C_1$-$C_4$ alkanoyloxy, carbamoyl or the group —$SO_2$—Y,
alk and $alk_1$ independently of one another are linear or branched $C_1$-$C_6$ alkylene, arylene is a phenylene or naphthylene radical which is unsubstituted or substituted by sulfo, carboxyl, $C_1$-$C_4$alkyl, $C_1$-$C_4$alkoxy or halogen, Q is a radical —O— or —$NR_1$—, in which $R_1$ is as defined above, W is a group —$SO_2$—$NR_2$—, —$CONR_2$— or —$NR_2CO$—, in which $R_2$ is as defined above, Y is vinyl or a radical —$CH_2$—$CH_2$—U and U is a group which can be split off under alkaline conditions, $Y_1$ is a group —CH(Hal)-$CH_2$-Hal or —C(Hal)=$CH_2$ and Hal is chlorine or bromine and l and m independently of one another are an integer from 1 to 6 and n is the number 0 or 1;

and $X_2$ is halogen or $C_1$-$C_4$ alkylsulfonyl;

$X_3$ is halogen or $C_1$-$C_4$ alkyl; and $T_2$ is hydrogen, cyano or halogen.

3. A process according to either claim 1 or claim 2, wherein $Z_1$, $Z_2$ and $Z_3$ are each independently of the others a radical of the formula (3a), (3b) or (3f) according to claim 2, in which Y is vinyl, β-chloroethyl or β-sulfatoethyl, $R_{1a}$ is hydrogen, I is the number 2 or 3, $X_1$ is halogen, $T_1$ is $C_1$-$C_4$ alkoxy, $C_1$-$C_4$ alkylthio, hydroxyl, amino, N-mono- or N,N-di-$C_1$-$C_4$ alkylamino which are unsubstituted or substituted in the alkyl moiety by hydroxy, sulfato or sulfo, morpholino, phenylamino or N—$C_1$-$C_4$ alkyl-N-phenylamino which is unsubstituted or substituted in the phenyl ring by sulfo, carboxy, acetylamino, chlorine, methyl or methoxy and in which the alkyl is unsubstituted or substituted by hydroxy, sulfo or sulfato, or naphthylamino which is unsubstituted or substituted by 1 to 3 sulfo groups, or $T_1$ is a fiber reactive radical of the formula

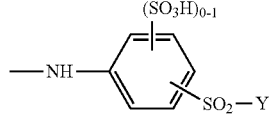

in which

Y is as defined above and $Y_1$ is a group —CH(Br)—$CH_2$—Br or —C(Br)=$CH_2$.

4. A process according to claim 1 wherein

B is a $C_2$-$C_6$ alkylene radical, which may be interrupted by 1, 2 or 3 —O— members and is unsubstituted or substituted by hydroxyl, or phenylene substituted by one or two sulfo groups, and $G_1$ and $G_2$ are each independently of the other chlorine or fluorine.

5. A process according to claim 1 wherein $A_1$ $A_2$ and $A_3$ are each independently of the others a monoazo or polyazo chromophore.

6. A process according to claim 1 wherein $A_1$, $A_2$ and $A_3$ are each independently of the others a radical of the formula

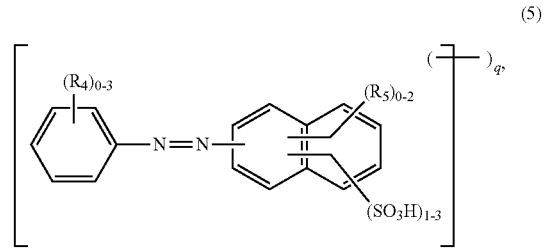

wherein $(R_4)_{0-3}$ denotes from 0 to 3 identical or different substituents from the group $C_1$-$C_4$ alkyl, $C_1$-$C_4$ alkoxy, $C_2$-$C_4$ alkanoylamino, ureido, sulfamoyl, carbamoyl, sulfomethyl, halogen, amino, hydroxy, carboxy and sulfo, $(R_5)_{0-2}$ denotes from 0 to 2 identical or different substituents from the group hydroxy, amino, N-mono-$C_1$-$C_4$ alkylamino, N,N-di-$C_1$-$C_4$alkylamino, $C_2$-$C_4$ alkanoylamino and benzoylamino, and q in formula (5) is the number 2 or 3, that is q depicts 2 or 3 bonds attached to the chromophore;

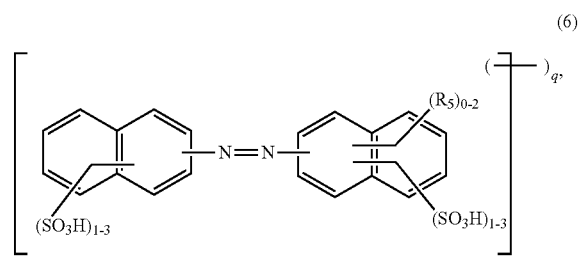

wherein $(R_5)_{0-2}$ is as defined above, and q in formula (6) is the number 2 or 3, that is q depicts 2 or 3 bonds attached to the chromophore;

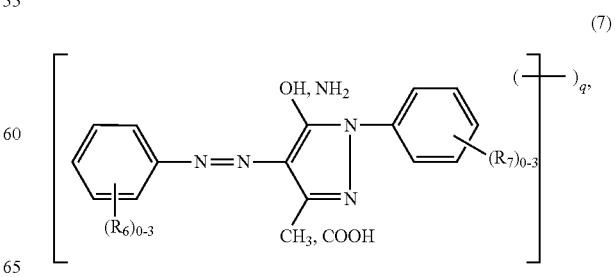

wherein
$(R_6)_{0-3}$ and $(R_7)_{0-3}$ independently of the other denotes from 0 to 3 identical or different substituents from the group $C_1$-$C_4$ alkyl, $C_1$-$C_4$ alkoxy, halogen, carboxy and sulfo, and q in formula (7) is the number 2 or 3, that is q depicts 2 or 3 bonds attached to the chromophore;

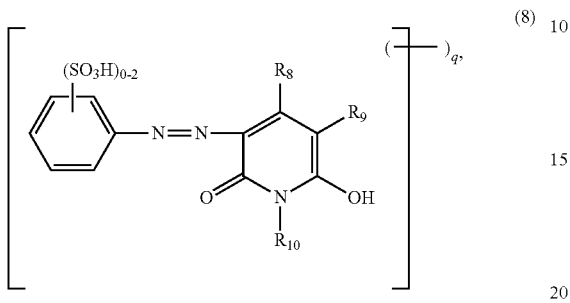

wherein
$R_8$ and $R_{10}$ are each independently of the other hydrogen, $C_1$-$C_4$ alkyl or phenyl, $R_9$ hydrogen, cyano, carbamoyl or sulfomethyl, and q in formula (8) is the number 2 or 3, that is q depicts 2 or 3 bonds attached to the chromophore;

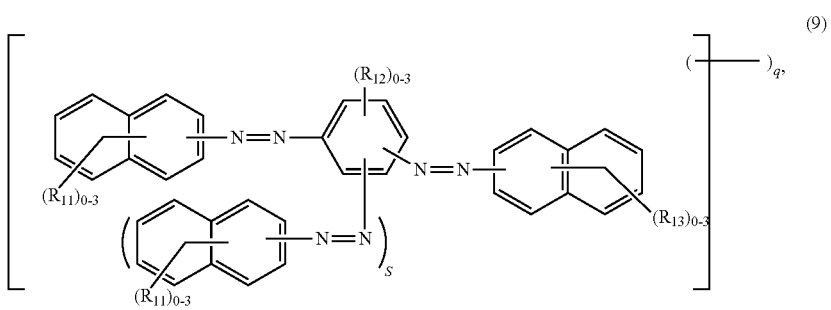

wherein
$(R_{11})_{0-3}$ is as defined for $(R_4)_{0-3}$,
$(R_{12})_{0-3}$ denotes from 0 to 3 identical or different substituents from the group $C_1$-$C_4$ alkyl, $C_1$-$C_4$ alkoxy, halogen, amino, carboxy and sulfo,
$(R_{13})_{0-3}$ is as defined for $(R_4)_{0-3}$, or $R_{13}$ is a radical —N=N-Ph, wherein Ph is phenyl that is unsubstituted or substituted by $C_1$-$C_4$ alkyl, $C_1$-$C_4$ alkoxy, halogen, carboxy or sulfo,
s is the number 0 or 1, and
q in formula (9) is the number 2 or 3, that is q depicts 2 or 3 bonds attached to the chromophore;

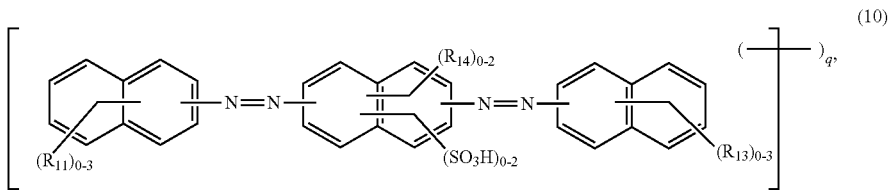

wherein $(R_{11})_{0-3}$ and $(R_{13})_{0-3}$ independently of the other are as defined above, $(R_{14})_{0-2}$ denotes from 0 to 2 identical or different substituents from the group $C_1$-$C_4$ alkyl, $C_1$-$C_4$ alkoxy, halogen, carboxy, sulfo, hydroxyl, amino, N-mono-$C_1$-$C_4$ alkylamino, N,N-di-$C_1$-$C_4$ alkylamino, $C_2$-$C_4$ alkanoylamino and benzoylamino, and q in formula (10) is the number 2 or 3, that is q depicts 2 or 3 bonds attached to the chromophore;

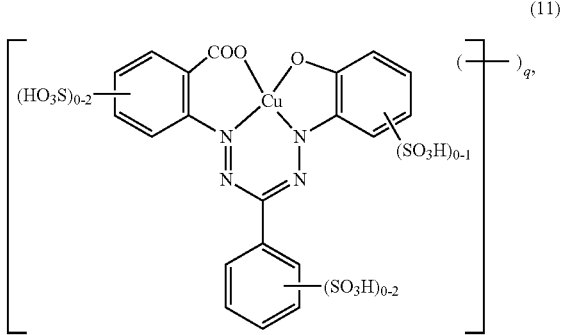
(11)

wherein the benzene nuclei do not contain any further substituents or are further substituted by $C_1$-$C_4$ alkyl, $C_1$-$C_4$ alkoxy, $C_1$-$C_4$ alkylsulfonyl, halogen or by carboxy, and q is the number 2 or 3, that is q depicts 2 or 3 bonds attached to the chromophore;

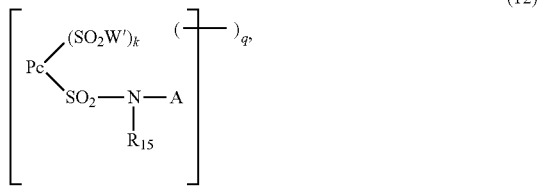
(12)

wherein

Pc is the radical of a metal phthalocyanine,

W' is —OH and/or —$NR_{16}R_{16}'$ and $R_{16}$ and $R_{16}'$ are each independently of the other hydrogen or $C_1$-$C_4$ alkyl that is unsubstituted or substituted by hydroxyl or by sulfo, $R_{15}$ is hydrogen or $C_1$-$C_4$ alkyl, A is a phenylene radical that is unsubstituted or substituted by $C_1$-$C_4$ alkyl, $C_1$-$C_4$ alkoxy, halogen, carboxy or by sulfo, or is a $C_2$-$C_6$ alkylene radical, k is from 1 to 3, and q is the number 2 or 3, that is q depicts 2 or 3 bonds attached to the chromophore; or

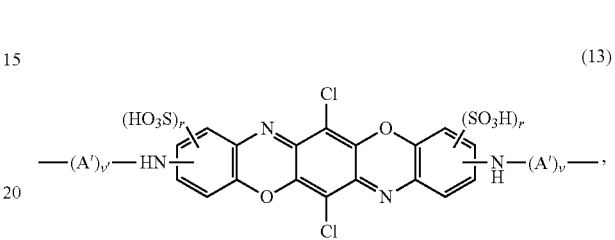
(13)

wherein

A' is a phenylene radical that is unsubstituted or substituted by $C_1$-$C_4$ alkyl, $C_1$-$C_4$ alkoxy, halogen, carboxy or by sulfo, or is a $C_2$-$C_6$ alkylene radical, r independently is the number 0, 1 or 2, and v and v' are each independently of the other the number 0 or 1.

7. A process according to claim 6, wherein $A_1$, $A_2$ and $A_3$ are each independently of the others a radical of formula (5), (6), (9) or (10).

8. A process according to claim 1 wherein the collagen containing fibrous material is treated with a liquor containing at least one reactive dyestuff of formula (1).

9. A process according to claim 8, wherein the collagen containing fibrous material is treated with a liquor containing at least one reactive dyestuff of formula $$A_{1a}\text{-}(Z_1)_{2-3} \quad (1a)$$

together with at least one reactive dyestuff of formula $$A_{1b}\text{-}(Z_1)_2 \quad (1b),$$

wherein $A_{1a}$ is a radical of formula

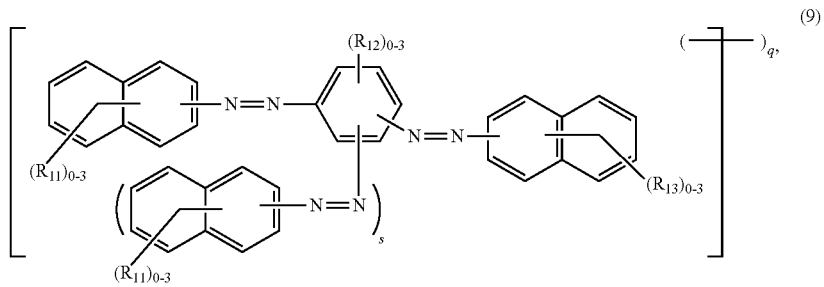
(9)

$A_{1b}$ is a radical of the formula

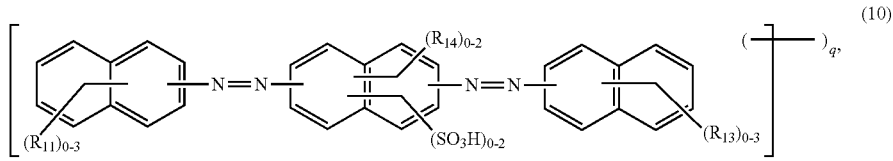

wherein
$(R_{11})_{0-3}$ denotes from 0 to 3 identical or different substituents from the group $C_1$-$C_4$ alkyl,
$C_1$-$C_4$ alkoxy, $C_2$-$C_4$ alkanoylamino, ureido, sulfamoyl, carbamoyl, sulfomethyl, halogen, amino, hydroxy, carboxy and sulfo,
$(R_{12})_{0-3}$ denotes from 0 to 3 identical or different substituents from the group $C_1$-$C_4$ alkyl,
$C_1$-$C_4$ alkoxy, halogen, amino, carboxy and sulfo,
$(R_{13})_{0-3}$ is as defined for $(R_{11})_{0-3}$, or $R_{13}$ is a radical —N=N-Ph, wherein Ph is phenyl that is unsubstituted or substituted by $C_1$-$C_4$ alkyl, $C_1$-$C_4$ alkoxy, halogen, carboxy or sulfo,
$(R_{14})_{0-2}$ denotes from 0 to 2 identical or different substituents from the group $C_1$-$C_4$ alkyl,
$C_1$-$C_4$alkoxy, halogen, carboxy, sulfo, hydroxyl, amino, N-mono-$C_1$-$C_4$ alkylamino, N,N-di-$C_1C_4$ alkylamino, $C_2$-$C_4$alkanoylamino and benzoylamino,
s is the number 0 or 1,
q is the number 2 or 3, that is q depicts 2 or 3 bonds attached to the chromophore, and
$Z_1$ independently denotes 2 or 3 identical or different fiber reactive radicals of formula $$—SO_2—Y \quad (3a)$$

or $$—NH—CO—(CH_2)_l—SO_2—Y \quad (3b),$$

wherein
Y is vinyl, β-chloroethyl or β-sulfatoethyl, and
l is the number 2, 3 or 4.

10. A process according to claim 1 wherein the amount of the at least one reactive dyestuff is in the range of from 1.0% to 10% based on the pickle weight of the collagen containing fibrous material.

11. A process according to claim 1 wherein fixing further comprises increasing the temperature of the aqueous liquor to not more than 50° C.

12. A process according to claim 1 wherein fixing is conducted in the presence of at least one inorganic salt.

13. A process according to claim 1 wherein fixing is conducted in the presence of at least one salt of a carboxylic acid.

14. The leather or the leather imitation obtained by the process according to claim 1.

15. The process according to claim 6, wherein Pc is the radical of a copper or nickel phthalocyanine and r is independently 0 or 1.

16. The process according to claim 12, wherein the inorganic salt is sodium sulphate (Glauber salt) or potassium sulphate.

17. The process according to claim 13, wherein the carboxylic acid is sodium formate or tetrasodium ethylenediaminetetraacetic acid (EDTA).

18. The process according to claim 1, wherein the aqueous liquor has a pH below 7.

19. The process according to claim 1, wherein the aqueous liquor has a pH of 8.5 or less.

20. The process according to claim 1, wherein the aqueous liquor has a pH below 7, and fixing comprises increasing the pH of the aqueous liquor to at least 10.

* * * * *